US012269437B2

(12) United States Patent
Zhuang et al.

(10) Patent No.: US 12,269,437 B2
(45) Date of Patent: Apr. 8, 2025

(54) SENSOR CLEANING MECHANISM FOR AN AUTONOMOUS VEHICLE

(71) Applicant: Nuro, Inc., Mountain View, CA (US)

(72) Inventors: Yuzhou Lucy Zhuang, Sunnyvale, CA (US); Peter Jon Kardassakis, Mountain View, CA (US); Joseph Penniman, Mountain View, CA (US); Ryan Tyler Mackintosh, Los Gatos, CA (US)

(73) Assignee: NURO, INC, Mountain View, CA (US)

( * ) Notice: Subject to any disclaimer, the term of this patent is extended or adjusted under 35 U.S.C. 154(b) by 896 days.

(21) Appl. No.: 17/096,152

(22) Filed: Nov. 12, 2020

(65) Prior Publication Data
US 2021/0170995 A1 Jun. 10, 2021

Related U.S. Application Data

(60) Provisional application No. 62/946,240, filed on Dec. 10, 2019.

(51) Int. Cl.
B60S 1/52 (2006.01)
B60S 1/50 (2006.01)

(52) U.S. Cl.
CPC ............ B60S 1/52 (2013.01); B60S 1/50 (2013.01)

(58) Field of Classification Search
CPC ...... B60S 1/52; B60S 1/50; B60S 1/56; G01S 2007/4977; G03B 17/02; G03B 17/08; G02B 27/0006
See application file for complete search history.

(56) References Cited

U.S. PATENT DOCUMENTS 7,627,235 B2 * 12/2009 McCutchen ....... G02B 27/0006
396/25
9,625,714 B2 4/2017 Rousseau
(Continued)

FOREIGN PATENT DOCUMENTS

CN 109109746 A 1/2019
DE 102013006686 A1 10/2014
(Continued)

OTHER PUBLICATIONS

Examination Report in counterpart European Application No. 20 825 082.9, mailed Jun. 23, 2023, 5 pages.
(Continued)

Primary Examiner — Adam R Mott
Assistant Examiner — Matthew C Gammon
(74) Attorney, Agent, or Firm — Edell, Shapiro & Finnan, LLC

(57) ABSTRACT

A sensor cleaning mechanism is provided herein. At least one sensor is configured to observe a condition associated with a vehicle. A housing is configured to be mounted on the vehicle. The housing includes a window surface configured to be disposed substantially within a field of view of the at least one sensor. A fluid providing mechanism is configured to provide fluid to the window surface. An actuating mechanism is configured to rotate the housing about the at least one sensor at a first speed, thereby causing at least a portion of the fluid to be expelled from the window surface. The actuating mechanism also can be configured to change a speed of rotation of the housing to a second speed, which is greater than zero, in response to a determination that the window surface is substantially clear of the fluid.

34 Claims, 13 Drawing Sheets

(56) References Cited

U.S. PATENT DOCUMENTS

| | | | |
|---|---|---|---|
| 10,232,774 B2 | 3/2019 | Trebouet | |
| 10,307,800 B1 | 6/2019 | Lombrozo | |
| 11,535,204 B1* | 12/2022 | Lombrozo | B08B 1/143 |
| 2012/0056004 A1* | 3/2012 | Trager | B60S 1/50 239/284.1 |
| 2013/0300869 A1* | 11/2013 | Lu | H04N 23/811 348/148 |
| 2016/0103316 A1* | 4/2016 | Rousseau | G02B 27/0006 359/509 |
| 2016/0121855 A1* | 5/2016 | Doorley | B60S 1/56 15/250.01 |
| 2017/0244873 A1 | 8/2017 | Izabel et al. | |
| 2018/0001837 A1 | 1/2018 | Trebouet | |
| 2018/0086316 A1 | 3/2018 | Trebouet et al. | |
| 2018/0272999 A1 | 9/2018 | Giraud et al. | |
| 2018/0370500 A1 | 12/2018 | Garcia Crespo et al. | |
| 2019/0041234 A1 | 2/2019 | Ghannam | |
| 2019/0047522 A1 | 2/2019 | Giraud et al. | |
| 2019/0077378 A1 | 3/2019 | Giraud et al. | |
| 2019/0151865 A1* | 5/2019 | Zhao | B05B 1/046 |
| 2019/0152395 A1 | 5/2019 | Trebouet | |
| 2020/0108801 A1* | 4/2020 | Frederick | B60S 1/481 |
| 2020/0114877 A1* | 4/2020 | Hu | B60S 1/0411 |
| 2020/0130648 A1* | 4/2020 | Hu | B60S 1/28 |
| 2020/0191614 A1* | 6/2020 | Ellgas | G01D 11/245 |
| 2021/0063729 A1* | 3/2021 | Shimizu | B08B 17/00 |
| 2022/0099964 A1* | 3/2022 | Gilbertson | B60S 1/56 |

FOREIGN PATENT DOCUMENTS

| | | |
|---|---|---|
| WO | 2006060868 A2 | 6/2006 |
| WO | 2018007283 A1 | 1/2018 |

OTHER PUBLICATIONS

International Search Report and Written Opinion in counterpart International Application No. PCT/US2020/062584, mailed Mar. 11, 2021, 13 pages.

* cited by examiner

SENSOR CLEANING MECHANISM FOR AN AUTONOMOUS VEHICLE

CROSS REFERENCE TO RELATED APPLICATION

This application claims priority to U.S. Provisional patent Application No. 62/946,240, titled "Methods and Apparatus for Cleaning Sensors," filed Dec. 10, 2019, the entirety of which is incorporated herein by reference.

TECHNICAL FIELD

The disclosure relates generally to cleaning sensors on an autonomous vehicle.

BACKGROUND

Autonomous vehicles rely on sensors, such as cameras, to operate safely. Performance of the sensors may be adversely affected when sensor surfaces are dirty. For example, when dust covers a lens of a camera, images obtained using the camera may be compromised.

DESCRIPTION OF EXAMPLE EMBODIMENTS

Overview

Figure 1:
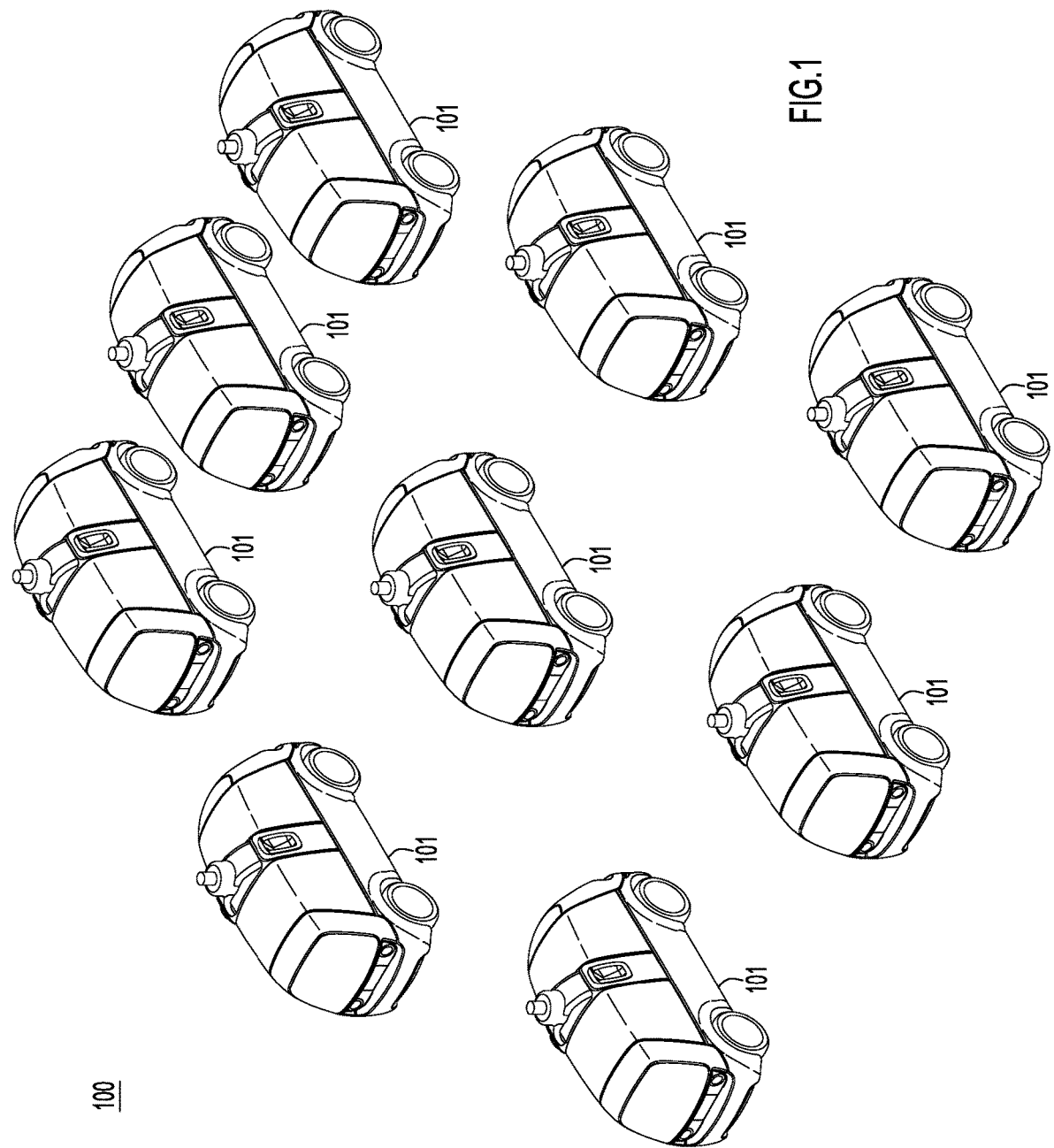
FIG. 1 is a diagram of an autonomous vehicle fleet, according to an example embodiment.

In one embodiment, a sensor cleaning mechanism is provided. At least one sensor is configured to observe a condition associated with a vehicle. A housing is configured to be mounted on the vehicle. The housing includes a window surface configured to be disposed substantially within a field of view of the sensor. A fluid providing mechanism is configured to provide fluid to the window surface. An actuating mechanism is configured to rotate the housing about the at least one sensor at a first speed, thereby causing at least a portion of the fluid to be expelled from the window surface. The actuating mechanism also can be configured to change a speed of rotation of the housing to a second speed, which is greater than zero, in response to a determination that the window surface is substantially clear of the fluid.

Example Embodiments

The handling and delivery of goods and services using autonomous vehicles will improve society, e.g., by allowing people to engage in productive work while waiting for an autonomous vehicle to deliver goods rather than spending time procuring the goods. As the use of autonomous vehicles is growing, the ability to operate the autonomous vehicles efficiently and safely is becoming more important. Autonomous vehicles rely on sensors, such as cameras, to operate safely.

When performance of the sensors is compromised, safe operation of the autonomous vehicle also may be compromised. For example, performance of a sensor may be compromised if a surface of the sensor is obstructed. A sensor that includes a camera may be obstructed, e.g., if dirt, dust, debris, rain, or another item obstructs a lens of the camera. For example, the obstruction may cause measurements (e.g., images) made by the sensor to not accurately reflect an environment around the sensor.

In an example embodiment, a sensor cleaning mechanism is provided for cleaning sensor surfaces. The sensor cleaning mechanism includes a fluid providing mechanism, which is configured to provide a fluid, such as water, a cleaning agent, or another liquid, to a window surface within a field of view of at least one sensor. For example, the fluid providing mechanism can provide the fluid in response to a determination (e.g., using the sensor(s)) that the window surface is in need of cleaning.

The sensor cleaning mechanism includes an actuating mechanism configured to rotate a housing including the window surface about the sensor(s). For example, the actuating mechanism can initiate a rotation of the housing or change a speed of rotation of the housing (e.g., by increasing or decreasing the speed of rotation) when the fluid is provided to the window surface, to substantially expel at least a portion of the fluid from the window surface. Forces, such as gravitational forces and centrifugal forces, may effectively push or otherwise force the fluid (and, potentially, dirt, dust, debris, or other material coupled to the fluid or otherwise disposed on the window surface) off of the window surface when the housing is rotated. This rotation may prevent the fluid from obstructing the field of view of the sensor(s), e.g., by not allowing the fluid to cling to the window surface. The actuating mechanism can initiate or change the speed of rotation of the housing upon (or soon before or after) providing the fluid, or after first slowing or maintaining a speed of the rotation (or non-rotation) of the housing for a period of time to allow the fluid to clean the window surface before it is expelled from the window surface. For example, the actuating mechanism may wait a predetermined period of time (or until the sensor(s) indicate that it is an appropriate time, or otherwise) to initiate, or change the speed of, the rotation.

In an example embodiment, the actuating mechanism can be further configured to change the speed of rotation of the housing (e.g., returning it to a speed at which it was rotating prior to, or during, provision of the fluid, or otherwise), in response to a determination that the window surface is substantially clear of the fluid. For example, the actuating mechanism can slow the speed of rotation to a speed that is at or above zero rotations per minute in response to a determination that the window surface is substantially clear of the fluid.

In another example embodiment, the actuating mechanism is further configured to initiate rotation of the housing or change a speed of rotation of the housing (e.g., by increasing or decreasing the speed of rotation), without providing fluid to the window surface, in response to detecting a liquid, such as rain, water droplets, etc., on the window surface. For example, if rain, water, or another liquid is detected within a field of view of the sensor, the actuating mechanism can initiate, or increase a speed of, rotation of the housing to prevent the liquid from depositing on, and/or clinging to, the window surface. Thus, the window surface can be cleared of the obstruction with or without provision of a cleaning fluid or other liquid by the sensor cleaning mechanism.

In yet another example embodiment, the actuating mechanism may be configured to change a speed of rotation of the housing if the housing already is rotating in response to rain, water, or another liquid being within a field of view of the sensor when it is determined that the window surface needs cleaning (e.g., because dirt, debris, or another material are also detected within the field of view of the sensor). For example, the housing may be rotating at a relatively fast speed of rotation in response to the rain, water droplets, or other liquid, and the actuating mechanism can slow the speed of rotation upon (or soon before or after) provision of fluid by the fluid providing mechanism, to prevent the fluid from being expelled before it has had an opportunity to clean the window surface. After a predetermined period of time (or when the sensor(s) indicate that the fluid has had an opportunity to clean the window surface, or time otherwise has elapsed after provision of the fluid), the actuating mechanism may increase the speed of rotation to expel the cleaning fluid and any other fluid, dirt, dust, debris, etc. from the window surface. The actuating mechanism can be further configured to change the speed of rotation of the housing (e.g., increasing it to its original speed of rotation, decreasing it to the slower speed of rotation at which the fluid was provided, or otherwise) once the window surface is substantially clean/clear.

Example embodiments that may be used to implement the features and functionality of this disclosure will now be described with more particular reference to the accompanying figures. While like reference numerals represent like elements throughout the several figures for purposes of simplicity and clarity, repetition of reference numerals does not itself dictate a relationship between the various embodiments and/or configurations discussed. In addition, while reference may be made to the spatial relationships between various components and to the spatial orientation of various aspects of components as depicted in the attached drawings, as will be recognized by those skilled in the art after a complete reading of the present disclosure, the devices, components, members, apparatuses, etc. described herein may be positioned in any desired orientation. Thus, the use of terms such as "top," "bottom," "front," "back," "left," "right," "above," "under," "over," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

When used to describe a range of dimensions and/or other characteristics (e.g., time, distance, length, etc.) of an element, operations, conditions, etc. the phrase "between X and Y" represents a range that includes X and Y. Similarly, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially". Similarly, when used herein, the term "comprises" and its derivations (such as "comprising", etc.) should not be understood in an excluding sense, that is, these terms should not be interpreted as excluding the possibility that what is described and defined may include further elements, steps, etc. Further, each example embodiment described herein as illustrative and is not to be construed as a preferred or advantageous embodiment, but rather as one example or illustration of a possible embodiment.

Referring initially to FIG. 1, an autonomous vehicle fleet 100 will be described in accordance with an example embodiment. The autonomous vehicle fleet 100 includes a plurality of autonomous vehicles 101. Each autonomous vehicle 101 is a manned or unmanned mobile machine configured to transport people, cargo, or other items, whether on land or water, air, or another surface, such as a car, wagon, van, tricycle, truck, bus, trailer, train, tram, ship, boat, ferry, drove, hovercraft, aircraft, spaceship, etc.

Each autonomous vehicle 101 may be fully or partially autonomous such that the vehicle can travel in a controlled manner for a period of time without human intervention. For example, a vehicle may be "fully autonomous" if it is configured to be driven without any assistance from a human operator, whether within the vehicle or remote from the vehicle, while a vehicle may be "semi-autonomous" if it uses some level of human interaction in controlling the operation of the vehicle, whether through remote control by, or remote assistance from, a human operator, or local control/assistance within the vehicle by a human operator. A vehicle may be "non-autonomous" if it is driven by a human operator located within the vehicle. A "fully autonomous vehicle" may have no human occupant or it may have one or more human occupants that are not involved with the operation of the vehicle; they may simply be passengers in the vehicle.

In an example embodiment, each autonomous vehicle 101 may be configured to switch from a fully autonomous mode to a semi-autonomous mode, and vice versa. Each autonomous vehicle 101 also may be configured to switch between a non-autonomous mode and one or both of the fully autonomous mode and the semi-autonomous mode.

The fleet 100 may be generally arranged to achieve a common or collective objective. For example, the autonomous vehicles 101 may be generally arranged to transport and/or deliver people, cargo, and/or other items. A fleet management system (not shown) can, among other things, coordinate dispatching of the autonomous vehicles 101 for purposes of transporting, delivering, and/or retrieving goods and/or services. The fleet 100 can operate in an unstructured open environment or a closed environment.

Figure 2:
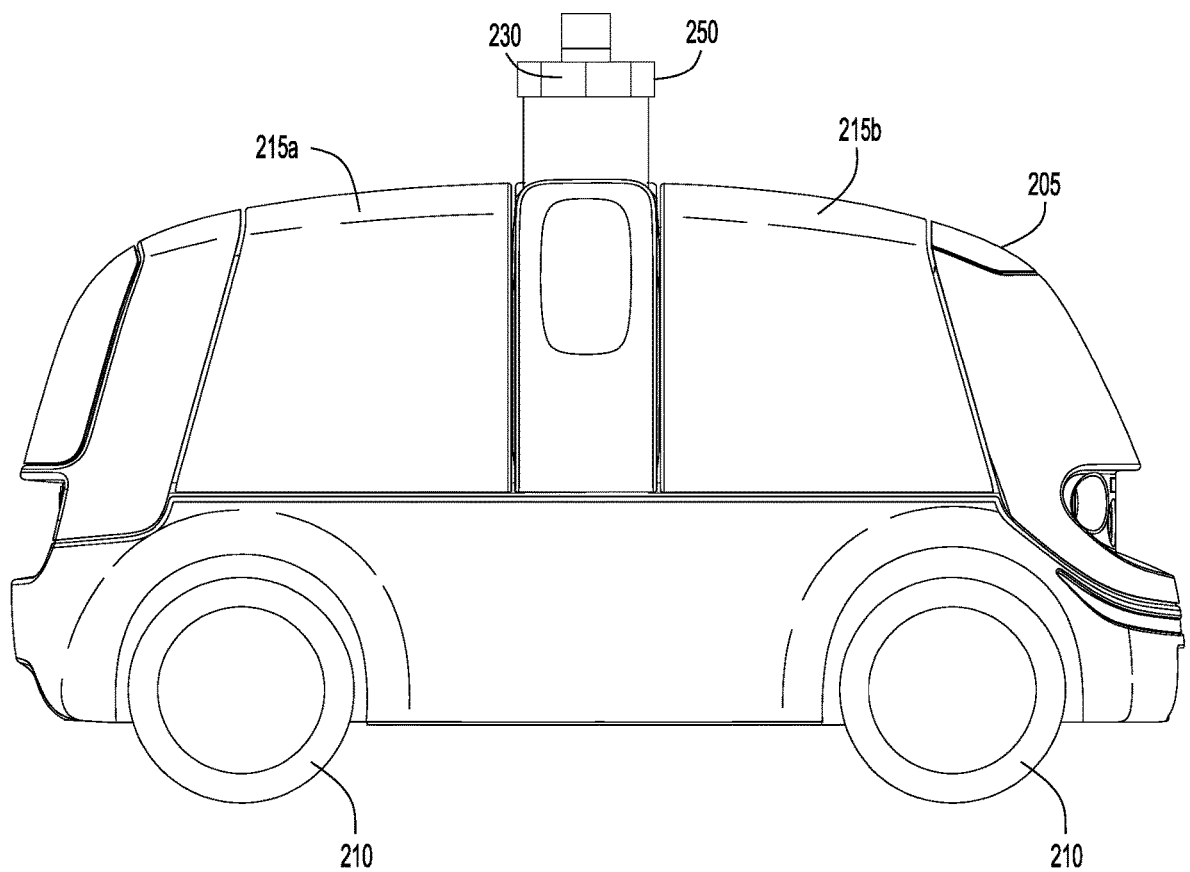
FIG. 2 is a side view of a vehicle having a sensor cleaning mechanism, according to an example embodiment.

FIG. 2 is a diagram of a side of an autonomous vehicle 101, according to an example embodiment. The autonomous vehicle 101 includes a body 205 configured to be conveyed by wheels 210 and/or one or more other conveyance mechanisms. In an example embodiment, the autonomous vehicle 101 is relatively narrow (e.g., approximately two to approximately five feet wide), with a relatively low mass and low center of gravity for stability.

The autonomous vehicle 101 may be arranged to have a moderate working speed or velocity range of between approximately one and approximately forty-five miles per hour ("mph"), e.g., approximately twenty-five mph, to accommodate inner-city and residential driving speeds. In addition, the autonomous vehicle 101 may have a substantially maximum speed or velocity in a range of between approximately thirty and approximately ninety mph, which may accommodate, e.g., high speed, intrastate or interstate driving. As would be recognized by a person of ordinary skill in the art, the vehicle size, configuration, and speed/velocity ranges presented herein are illustrative and should not be construed as being limiting in any way.

The autonomous vehicle 101 includes multiple compartments (e.g., compartments 215a and 215b), which may be assignable to one or more entities, such as one or more customers, retailers, and/or vendors. The compartments are generally arranged to contain cargo and/or other items. In an example embodiment, one or more of the compartments may be secure compartments. The compartments may have different capabilities, such as refrigeration, insulation, etc., as appropriate. It should be appreciated that the number, size, and configuration of the compartments may vary. For example, while two compartments (215a, 215b) are shown, the autonomous vehicle 101 may include more than two or less than two (e.g., zero or one) compartments.

The autonomous vehicle 101 further includes one or more sensors 230 configured to view and/or monitor conditions on or around the autonomous vehicle 101. For example, the sensor(s) 230 can include one or more cameras, light detection and ranging ("LiDAR") sensors, radar, ultrasonic sensors, microphones, altimeters, etc. A sensor cleaning mechanism 250 is configured to clean a surface within a field of view of the sensor(s) 230 by providing a fluid to the surface and rotating the surface about the sensor(s) 230. In addition, or in the alternative, the sensor cleaning mechanism 250 can be configured to clear a surface within a field of view of the sensor(s) 230 of a liquid obstruction, such as rain, water, or another liquid, by rotating the surface about the sensor(s) 230 with or without providing fluid to the surface. For example, if rain, water, or another liquid is detected within a field of view of the sensor(s) 230, the sensor cleaning mechanism 250 can initiate, or change (e.g., by increasing or decreasing) a speed of, rotation of the surface to prevent the liquid from depositing on, and/or clinging to, the surface. The sensor cleaning mechanism 250 is described in more detail below.

Figure 3:
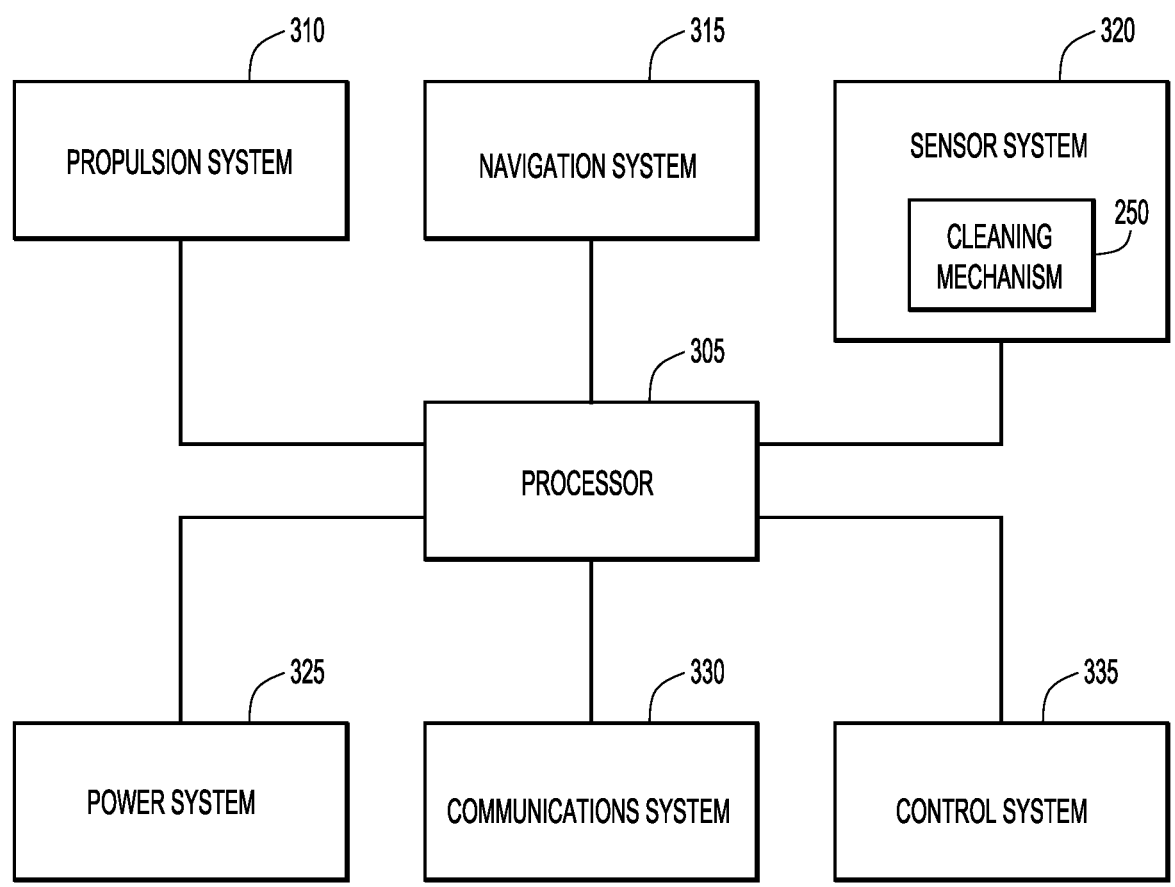
FIG. 3 is a block diagram representation of certain components of the vehicle of FIG. 2, according to an example embodiment.

FIG. 3 is a block diagram representation of certain functional components of the autonomous vehicle 101, according to an example embodiment. With reference to FIGS. 1-3, the autonomous vehicle 101 includes a processor 305, which is operatively coupled to, and configured to send instructions to, and receive instructions from or for, various systems of the autonomous vehicle 101, including: a propulsion system 310, a navigation system 315, a sensor system 320, a power system 325, a communications system 330, and a control system 335. The processor 305 and systems are operatively coupled to, or integrated with, the body 205 (FIG. 2) of the autonomous vehicle 101 and generally cooperate to operate the autonomous vehicle 101.

The propulsion system 310 includes components configured to drive (e.g., move or otherwise convey) the autonomous vehicle 101. For example, the propulsion system 310 can include an engine, wheels, steering, and a braking system, which cooperate to drive the autonomous vehicle 101. In an example embodiment, the engine may be a gas engine, a turbine engine, an electric motor, and/or a hybrid gas/electric engine. As would be appreciated by a person of ordinary skill in the art, the propulsion system 310 may include additional or different components suitable or desirable for conveying an object, which are now known or hereinafter developed, such as one or more axles, treads, wings, rotors, blowers, rockets, propellers, and/or other components.

Although the autonomous vehicle 101 shown in FIGS. 1 and 2 has a 4-wheeled, 2-axle automotive configuration, this configuration is illustrative and should not be construed as being limiting in any way. For example, the autonomous vehicle 101 may have more or less than 4 wheels, more or less than 2 axles, and a non-automotive configuration in an alternative example embodiment. For example, the vehicle may be configured for travel other than land travel, such as water travel, hover travel, and/or air travel without departing from the spirit or the scope of the present disclosure.

The navigation system 315 can be configured to control the propulsion system 310 and/or provide guidance to an operator associated with the autonomous vehicle 101 to navigate the autonomous vehicle 101 through paths and/or within unstructured open or closed environments. The navigation system 315 may include, e.g., digital maps, street view photographs, and/or a global positioning system ("GPS") point. For example, the navigation system 315 may cause the autonomous vehicle 101 to navigate through an environment based on information in the digital maps and information from sensors included in the sensor system 320.

The sensor system 320 includes one or more sensors (including, e.g., the sensor 230), which are configured to view and/or monitor conditions on or around the autonomous vehicle 101. For example, the sensors can ascertain when there are objects near the autonomous vehicle 101 to enable the autonomous vehicle 101 to safely guide the autonomous vehicle 101 (via the navigation system 315) around the objects. In an example embodiment, the sensor system 320 includes propulsion system sensors that monitor drive mechanism performance, drive train performance, and/or power system levels. The sensor system 320 also may include one or more microphones configured to detect sounds external to the autonomous vehicle 101, such as a siren from an emergency vehicle requesting a right-of-way, a honk from another vehicle, etc.

As noted above, the sensor system 320 can include a sensor cleaning mechanism 250 configured to clean a surface within a field of view of at least one of the sensors. For example, upon a determination that the surface is in need of cleaning, the sensor cleaning mechanism 250 can cause fluid to be provided to the surface and can further cause the surface to rotate, thereby causing the fluid and, potentially, dirt, dust, debris, and/or other materials disposed on the surface, to be expelled from the surface. In addition, or in the alternative, the sensor cleaning mechanism 250 can be configured to clear a surface within a field of view of the sensor(s) 230 of a liquid obstruction, such as rain, water, or another liquid, by causing the surface to rotate and, thereby causing the liquid to be expelled from the surface, with or without providing fluid to the surface. The sensor system 320 is described in more detail below with reference to FIGS. 4-9.

The power system 325 is arranged to provide power to the autonomous vehicle 101. Power may be provided as electrical power, gas power, or any other suitable power, e.g., solar power or battery power. In an example embodiment, the power system 325 may include a main power source and an auxiliary power source configured to power various components of the autonomous vehicle 101 and/or to generally provide power to the autonomous vehicle 101 when the main power source does not have the capacity to provide sufficient power.

The communications system 330 is arranged to enable communication between the autonomous vehicle 101 and an external person or device. For example, the communications system 330 can be configured to enable communication via wireless local area network (WLAN) connectivity (e.g., cellular) or any other wireless or mobile communication capability now known or hereinafter developed. In an example embodiment, the communications system 330 can communicate wirelessly with a fleet management system (not shown in FIG. 3), which is arranged to control and/or assist the autonomous vehicle 101 from a location remote from the autonomous vehicle 101. For example, the communications system 330 can generally obtain or receive data, store the data, and transmit or provide the data to the fleet management system and/or to one or more other vehicles within a fleet. The data may include, but is not limited to including, information relating to scheduled requests or orders, information relating to on-demand requests or orders, information relating to a need for the autonomous vehicle 101 to reposition itself, e.g., in response to an anticipated demand, information regarding an operational or mechanical need or behavior of the autonomous vehicle 101, information regarding an upcoming construction zone or other hazard in the path of the autonomous vehicle 101, etc.

In an example embodiment, the control system 335 may cooperate with the processor 305 and each of the other systems in the autonomous vehicle 101, including the propulsion system 310, the navigation system 315, the sensor system 320, the power system 325, and the communications system 330, to control operation of the autonomous vehicle 101. For example, the control system 335 may cooperate with the processor 305 and the other systems to determine where the autonomous vehicle 101 may safely travel and to detect (e.g., based on data from the sensor system 320 and/or from an external system (not shown) communicating with the autonomous vehicle 101 via the communications system 330), and navigate around, objects in a vicinity around the autonomous vehicle 101. In other words, the control system 335 may cooperate with the processor 305 and other systems to effectively determine and facilitate what the autonomous vehicle 101 may do within its immediate surroundings. For example, the control system 335 in cooperation with the processor 305 may essentially control the power system 325 and/or the navigation system 315 as part of driving or conveying the autonomous vehicle 101. In this sense, the control system 335 manages autonomous control of the autonomous vehicle 101. Additionally, the control system 335 may cooperate with the processor 305 and communications system 330 to provide data to, or obtain data from, other vehicles, a fleet management server, a GPS, a personal computer, a teleoperations system, a smartphone, or any other computing device via the communications system 330.

Figure 4:
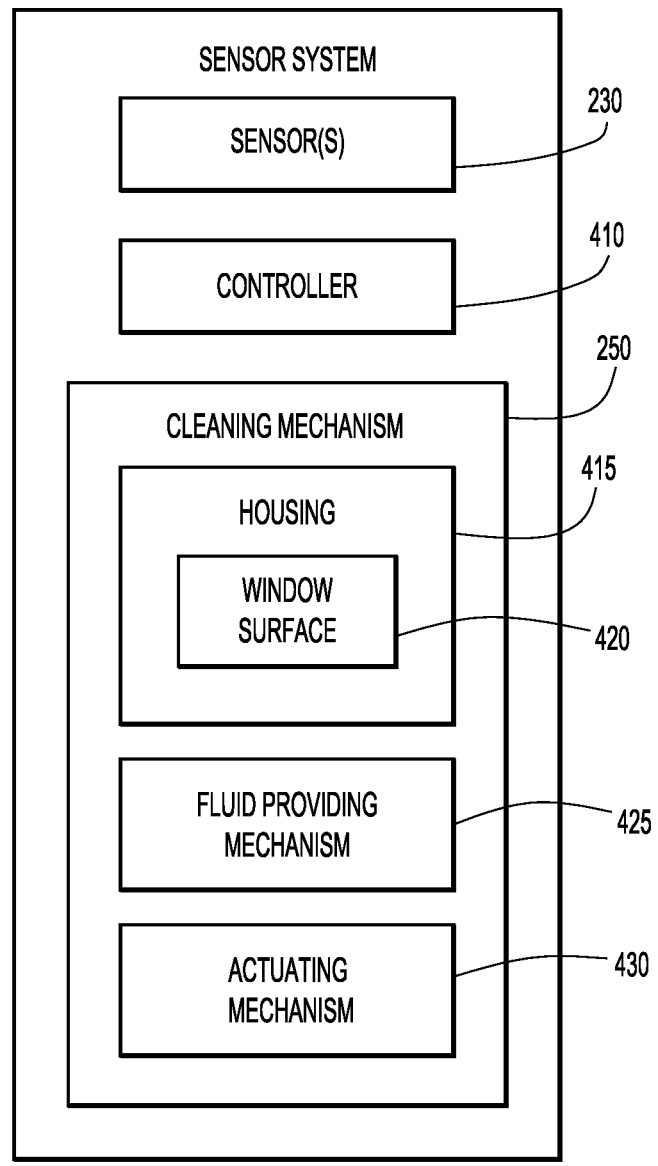
FIG. 4 is a block diagram representation of a sensor system, according to an example embodiment.

Turning to FIG. 4, the sensor system 320 is now described in more detail. The sensor system 320 includes at least one sensor 230, a controller 410, and the sensor cleaning mechanism 250. The sensor(s) 230 include one or more cameras, LiDAR sensors, radar, ultrasonic sensors, microphones, altimeters, or other mechanisms configured to capture images (e.g., still images and/or videos), sound, or other signals or information within an environment. For example, the sensor(s) 230 can include one or more cameras configured to capture images within a defined field of view.

The controller 410 includes computer hardware, software, logic, and/or other mechanisms configured to read and process the images, sound, and/or other signals or information captured by the sensor(s) 230. For example, the controller 410 can include computer vision, machine learning, and/or artificial intelligence functionality for identifying and classifying items within, or corresponding to, the captured images, sound, and/or other signals or information. The controller 410 can be configured, for example, to detect whether a sound captured by the sensor(s) 230 corresponds to an emergency vehicle, a honk from another vehicle, etc.

The controller 410 also can be configured to determine, based on one or more images captured by the sensor(s) 230, whether an obstruction exists in a field of view of the sensor(s) 230. For example the controller 410 can determine, based on the image(s), whether a surface in the field of view of the sensor(s) 230 is in need of cleaning, e.g., because dirt, dust, debris, and/or another material is disposed on the surface. The controller 410 also can determine, for example, whether rain, water, a cleaning agent, or another liquid, are present on the surface or otherwise in the field of view of the sensor(s) 230. For example, the controller 410 can determine that the surface in the field of view of the sensor(s) 230 is in need of clearing, with or without cleaning the surface, in response to detecting rain, water, a cleaning agent, or another liquid on the surface.

The sensor cleaning mechanism 250 includes a housing 415 configured to substantially house and/or enclose the sensor(s) 230. The housing 415 can generally protect the sensor(s) 230 from a surrounding environment while still enabling the sensor(s) 230 to capture images, sound, and/or other signals or information from the surrounding environment. For example, if the sensor(s) 230 include one or more cameras, a window surface 420 of the housing 415 can include a substantially transparent material through which the camera(s) can capture images of the environment, even though the window surface 420 may extend across one or more fields of view of the camera(s).

The sensor cleaning mechanism 250 further includes a fluid providing mechanism 425 configured to provide a fluid, such as water, a cleaning agent, or another liquid, to the window surface 420. For example, if the controller 410 determines that the window surface 420 is in need of cleaning, the fluid providing mechanism 425 can dispense fluid to the window surface 420. The fluid providing mechanism 425 can include, e.g., one or more nozzles, pumps, valves, reservoirs, or other mechanisms for storing and selectively dispensing fluid. For example, the fluid providing mechanism 425 can be coupled to, or integrated with, the housing 415. The fluid providing mechanism 425 also can be operatively coupled to the controller 410 via one or more wires or via a wireless technology now known or hereinafter developed, such as Bluetooth or Wi-Fi.

The sensor cleaning mechanism 250 also includes an actuating mechanism 430 configured to actuate the housing 415 and/or window surface 420 about the sensor(s) 230. For example, the actuating mechanism 430 can include one or more motors, bearings, biasing members, and/or other mechanical, electric, electromechanical, hydraulic, pneumatic, magnetic, thermal, or other devices configured to cause a rotational force to move the housing 415 and/or window surface 420 relative to, and independent from, the sensor(s) 230. The actuating mechanism 430 can be configured, e.g., to initiate a rotation of the housing 415 and/or window surface 420, or to change (e.g., by increasing or decreasing) a speed of rotation thereof, when fluid is provided to the window surface 420 by the fluid providing mechanism 425 and/or when the controller 410 determines that the window surface 420 is in need of clearing (with or without also being in need of cleaning and with or without provision of fluid by the fluid providing mechanism 425).

For example, this rotation can cause at least a portion of the fluid from the fluid providing mechanism 425 (if provided) and/or another liquid (such as rain) to be substantially expelled from the window surface 420. Forces, such as gravitational forces and centrifugal forces, may effectively push or otherwise force the fluid (and, potentially, dirt, dust, debris, or other material coupled to the fluid or otherwise disposed on the window surface 420) off of the window surface 420. This rotation may prevent the fluid from obstructing the field of view of the sensor(s) 230, e.g., by not allowing the fluid to cling to the window surface 420.

In an example embodiment, the actuating mechanism 430 can be further configured to change a speed of rotation of the housing 415, e.g., returning it to a speed at which it was rotating prior to provision and/or detection of the fluid or otherwise, in response to a determination by the controller 410 that the window surface 420 is substantially clear of the fluid. For example, the actuating mechanism 430 can be coupled to, or integrated with, the housing 415. The actuating mechanism 430 also can be operatively coupled to the controller 410 via one or more wires or via a wireless technology now known or hereinafter developed, such as Bluetooth® or Wi-Fi®.

Figure 5:
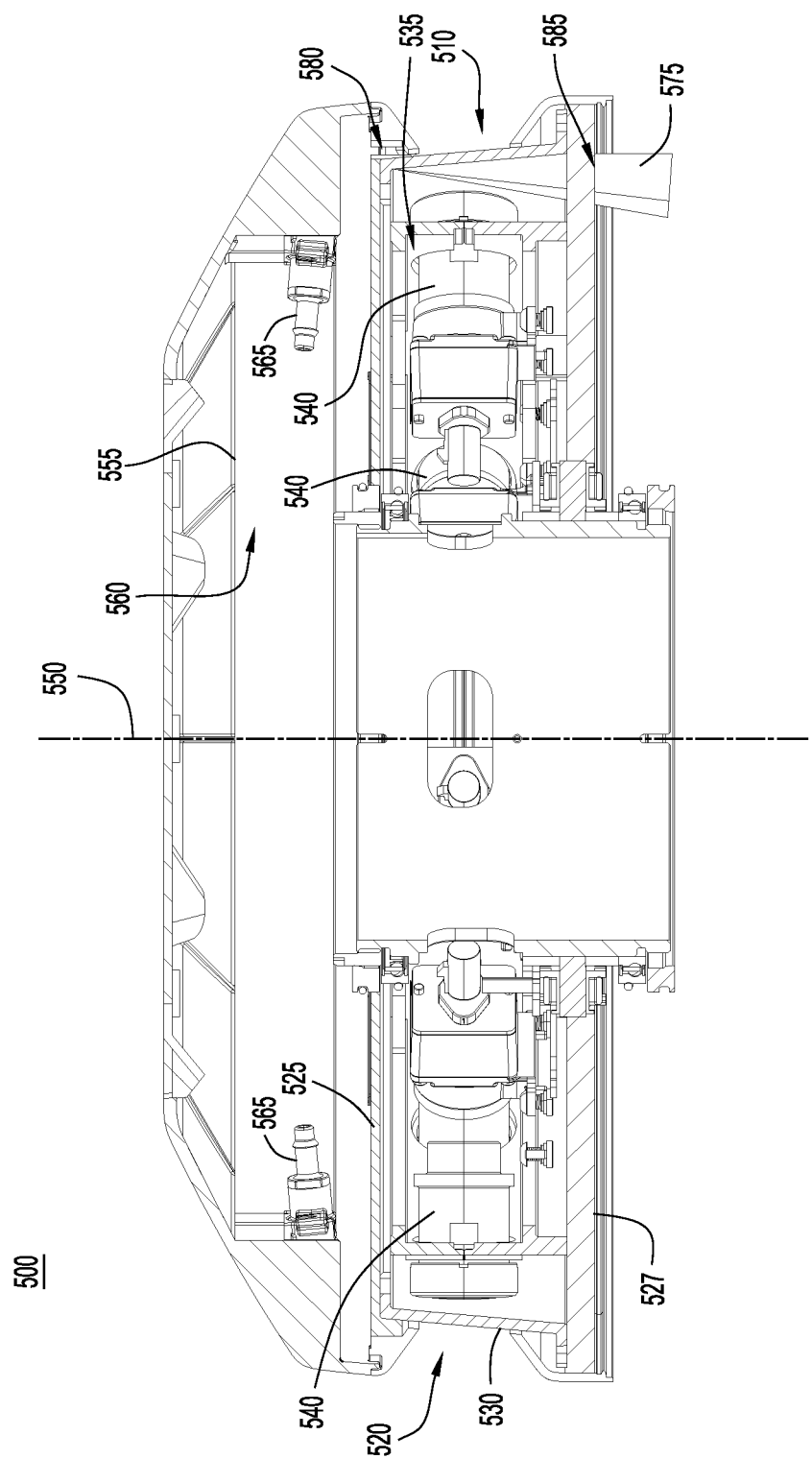
FIG. 5 is a cross-sectional view of a sensor system, according to an example embodiment.
Figure 6:
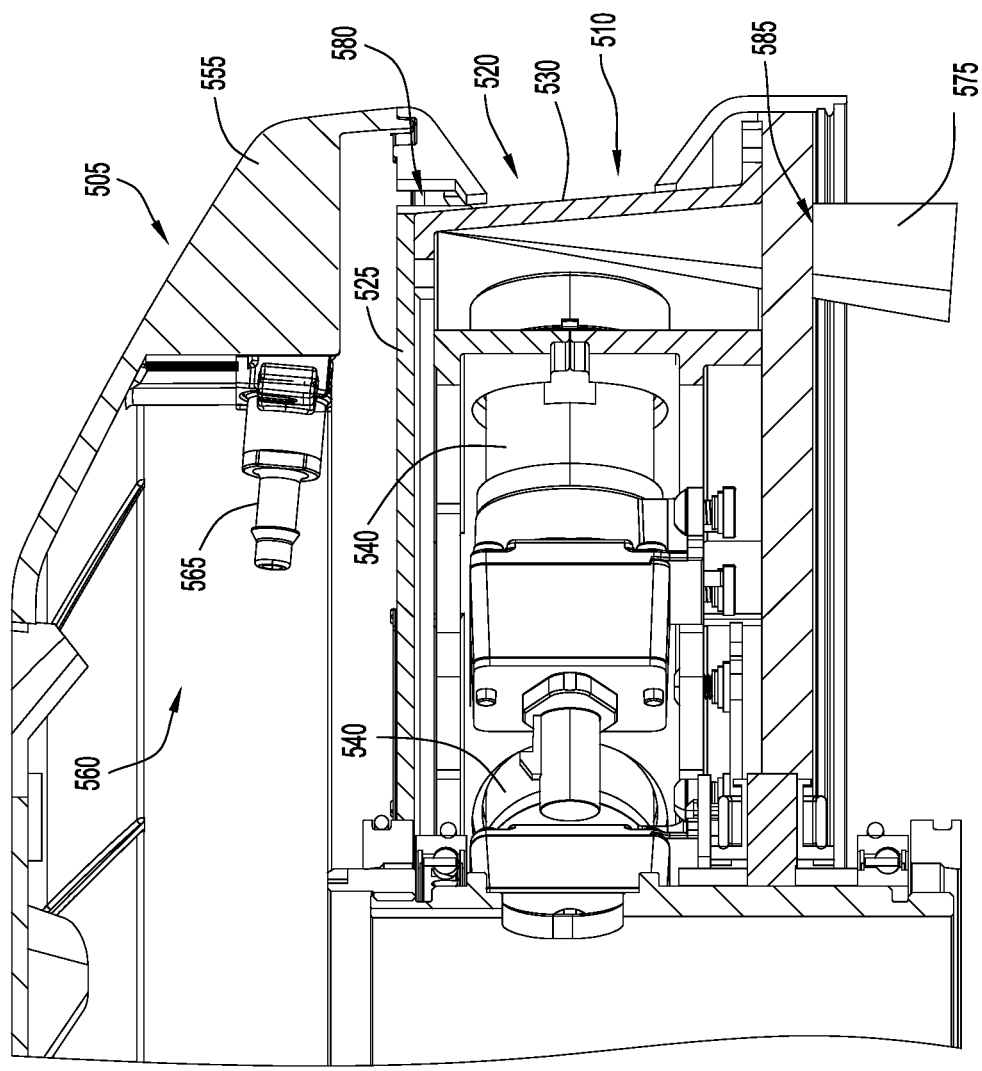
FIG. 6 is a close-up cross-sectional view of the sensor system of FIG. 5, according to an example embodiment.
Figure 7:
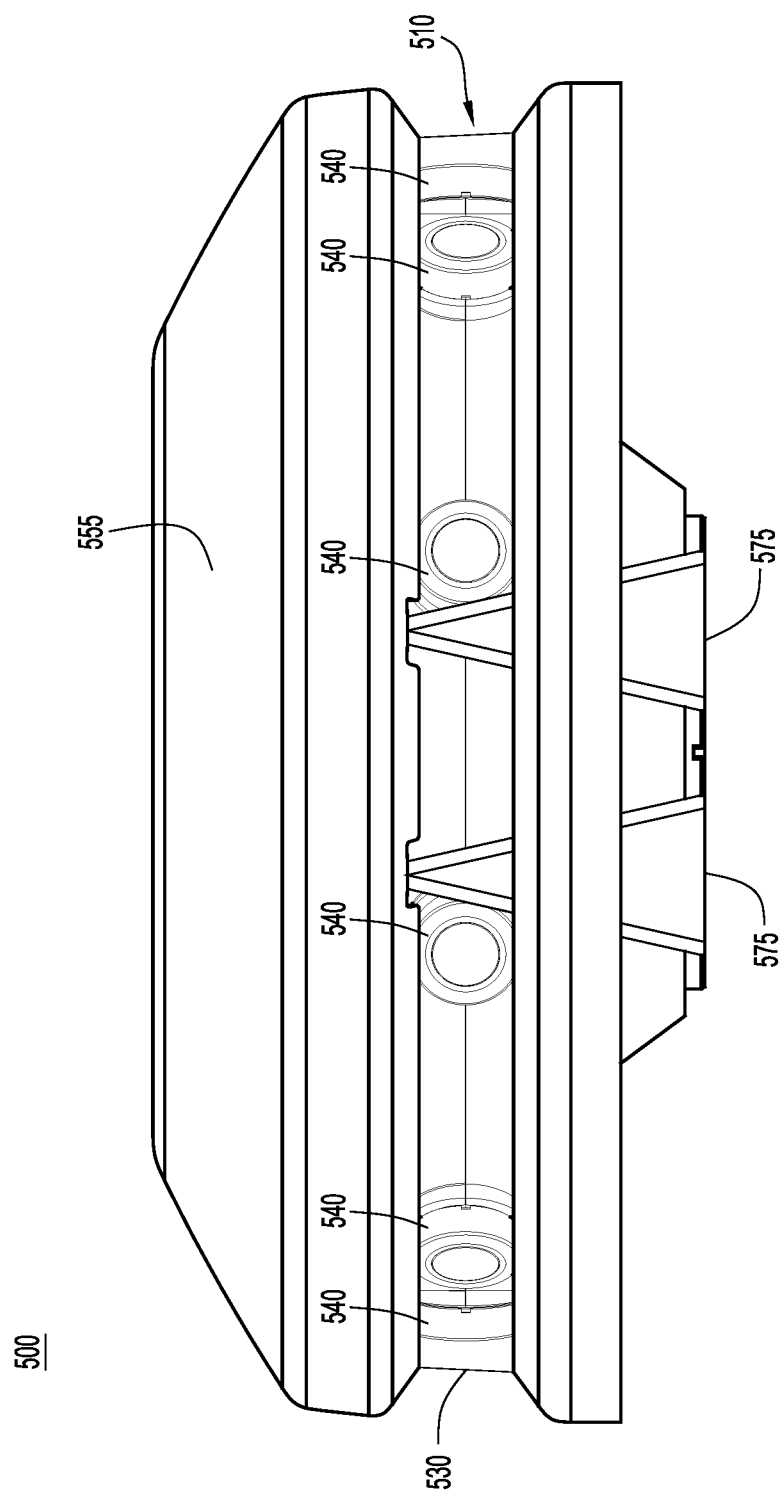
FIG. 7 is a side view of the sensor system of FIG. 5, according to an example embodiment.
Figure 8:
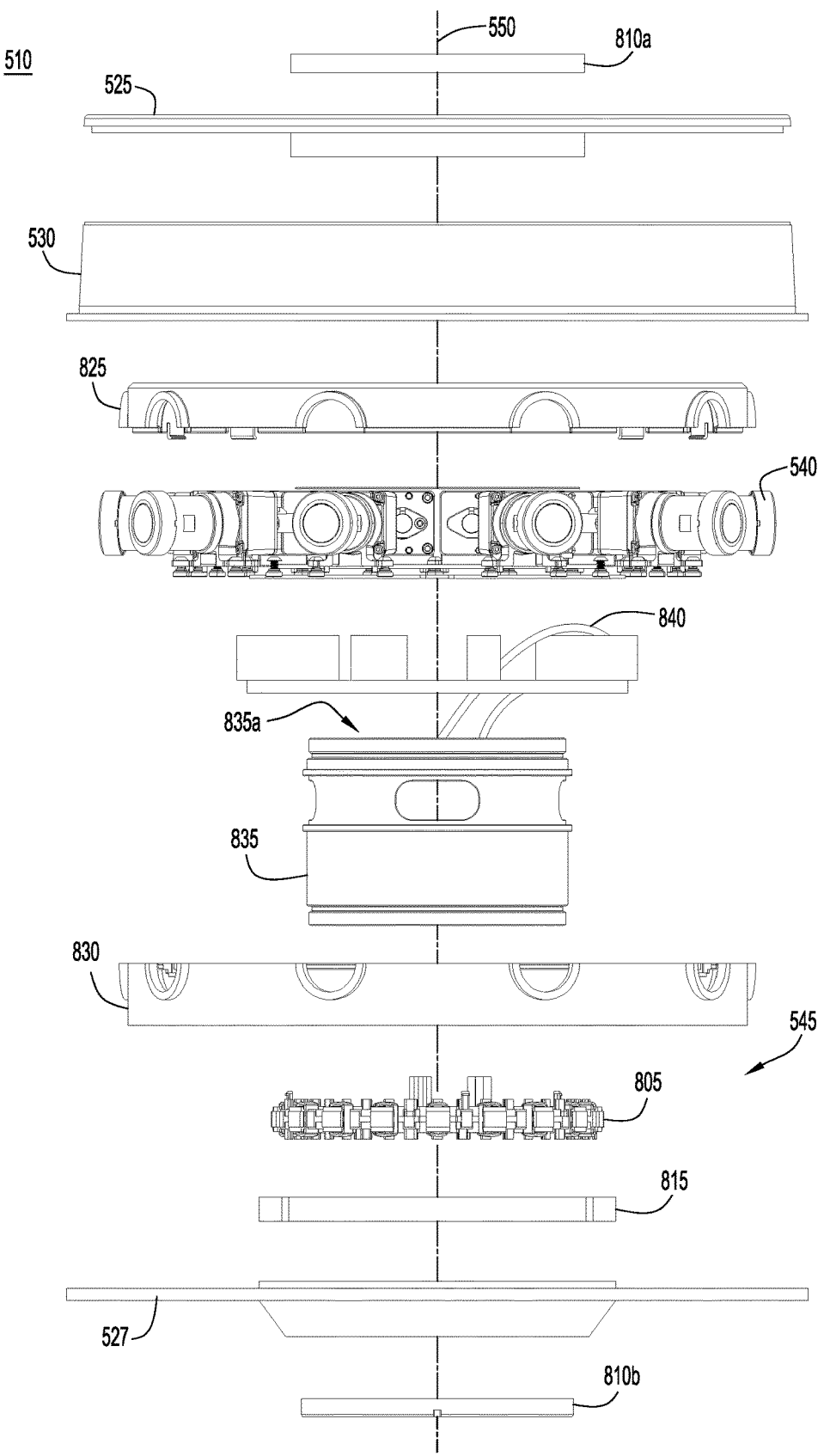
FIG. 8 is an exploded view of a sensor assembly, according to an example embodiment.
Figure 9:
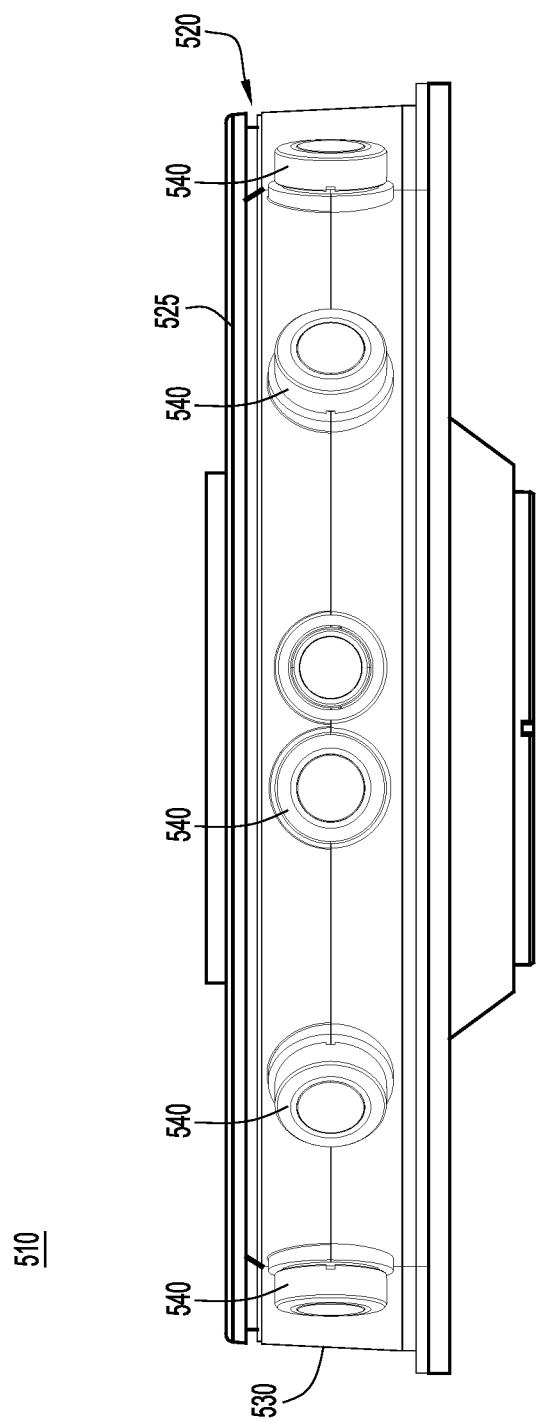
FIG. 9 is side view of the sensor assembly of FIG. 8, according to an example embodiment.

FIGS. 5-7 illustrate a sensor system 500 according to an example embodiment. The sensor system 500 includes a nozzle assembly 505 and a sensor assembly 510. FIGS. 8-9 illustrate the sensor assembly 510 in more detail. FIGS. 5-9 are described together for ease of description.

The sensor assembly 510 includes a housing 520 that includes a top surface 525 and a window surface 530. The window surface 530 is coupled to the top surface 525 or integrated therewith and extends substantially from the top surface 525 such that the top surface 525 and the window surface 530 define a space 535 within which a plurality of sensors 540 are disposed. In an example embodiment, the housing 520 also includes a bottom surface 527 coupled to or integrated with the window surface 530 such that the space 535 and sensors 540 are substantially enclosed between the top surface 525, bottom surface 527, and window surface 530.

Alternatively, the bottom surface 527 may be omitted to provide a substantially open bottom end for the housing 520. The top surface 525, window surface 530, and any bottom surface 527 can be formed from any suitable material, such as (optical or non-optical grade) metal, plastic, polycarbonate, glass, etc.

The sensors 540 can include one or more cameras, LiDAR sensors, radar, ultrasonic sensors, microphones, altimeters, or other mechanisms configured to capture images (e.g., still images and/or videos), sound, or other signals or information within an environment of the sensor assembly 510. In an example embodiment, the sensors 540 include cameras with fields of view extending generally outward from a central axis 550 of the sensor system 500. For example, as best seen in FIG. 8, the sensors 540 can be positioned between a top baffle 825 and a bottom baffle 830, substantially around a shaft 835 that extends substantially between the top baffle 825 and the bottom baffle 830. The shaft 835 may include one or more openings, such as opening 835a, within which one or more sensor cables 840 (or portions thereof) may be disposed. The fields of view of the sensors 540 may overlap with one another, adjoin one another, or be independent of one another. Though FIGS. 5-9 illustrate eight sensors 540 arranged in a generally circular shape around the central axis 550 (and shaft 835), it should be apparent that more or less than eight sensors 540, and any arrangement or configuration of the sensors 540, can be provided in alternative example embodiments.

The window surface 530 can extend across one or more of the fields of view of the sensors 540, substantially defining an outer perimeter of the housing 520. In an example embodiment, the window surface 530 is substantially transparent such that the sensors 540 can "see" through the window surface 530, and the window surface 530 is generally not visible in any images captured by the sensors 540. The window surface 530 may be uncoated or it may be coated with one or more materials for improving a performance quality of the sensors 540. For example, an exterior of the window surface 530 may be coated with a hydrophobic material to repel rain and/or other liquids from the window surface 530.

The size of the housing 520 may vary widely. For example, a diameter and height of the housing 520 may vary depending upon the requirements of an overall system in which the housing 520 is to be used. For example, a larger sized housing 520 may be provided to accommodate additional sensors 540 and/or larger sensors 540, while a smaller sized housing 520 may be provided to accommodate fewer sensors 540 and/or smaller sensors 540. In an example embodiment, a diameter of the top surface 525 may be approximately 300 millimeters, and a height of the window surface 530 may be approximately 40 millimeters, though it should be appreciated that the top surface 525 may be larger than 300 millimeters or smaller than 300 millimeters, and the height of the window surface 530 may be larger than 40 millimeters or smaller than 40 millimeters, in alternative example embodiments.

In an example embodiment, the window surface 530 has a substantially sloped or angled profile such that a diameter associated with a top of the window surface 530 is smaller than a diameter associated with a bottom of the window surface 530. For example, a sloped or angled profile may facilitate removal of rain, water, a cleaning agent, or another liquid from the window surface 530 through gravitational forces, with a downward slope repelling liquid downward and an upward slope repelling liquid upward. For example, the window surface 530 may have a slope of about −10 degrees, −5 degrees, +5 degrees, or +10 degrees in certain example embodiments. As would be recognized by a person of ordinary skill in the art, these slopes are illustrative and should not be construed as being limiting in any way. In addition, it should be appreciated that a sloped/angled profile is not required, and the window surface 530 may have an alternative configuration, e.g., a straight, non-angled profile, in alternative example embodiments. The window surface 530 also may include a curved profile, such as one or more curved or arced sections, for optical performance, optical focusing, or other reasons.

As best seen on FIG. 8, an actuating mechanism 545 includes components, such as a motor 805, bearings 810*a* and 810*b*, and a rotor 815, which are configured to cooperate to rotate the housing 520 about the central axis 550. In particular, the actuating mechanism 545 can cause the window surface 530 to rotate about the sensors 540, independently of the sensors 540 and any movement thereof. For example, the actuating mechanism 545 can be configured to initiate a rotation of the housing 520 and/or window surface 530, or to change (e.g., by increasing or decreasing) a speed of rotation thereof, when rain, dirt, dust, debris, and/or another obstruction is detected within a field of view of one or more of the sensors 540.

In an example embodiment, the actuating mechanism 545 rotates the housing 520 at a first speed when the sensor system 500 is in a regular operating mode and changes a rate of rotation of the housing 520 to a second speed (e.g., a speed that is greater than the first speed or a speed that is less than the first speed) when a controller of the sensor system 500 detects rain, dirt, dust, debris, and/or another obstruction within a field of view of one or more of the sensors 540. For example, the actuating mechanism 545 may rotate the housing 520 at the first speed when no obstructions are detected within the field of view of the sensors 540, to help prevent items (such as rain, dirt, dust, or debris) from being deposited on the housing 520. Alternatively, the actuating mechanism 545 may not rotate the housing 520 unless or until an obstruction is detected.

For example, the rotation (and/or changed rate of rotation) of the housing 520 can help expel fluid and/or other materials from the window surface 530, thereby potentially preventing the fluid and/or other materials from obstructing the fields of view of the sensors 540. The fluid may include fluid provided by sources external to the sensor system 500, such as rain, mud, or other items from an environment surrounding the sensor system 500. In addition, or in the alternative, the fluid may include fluid 575 provided by the nozzle assembly 505 as more fully described below.

In an example embodiment, the actuating mechanism 545 is configured to change (e.g., by increasing or decreasing) a rate of rotation from the second speed once any obstructions are cleared from the field of view of the sensors 540. For example, the actuating mechanism 545 can change the rate of rotation back to the first speed or to another speed, which is slower than or greater than the second speed, once the obstructions are cleared. For example, the controller of the sensor system 500 can determine the presence (or non-presence) of any fluid or other obstructions using one or more images captured by the sensors 540.

The speed of rotation may vary widely depending on a number of considerations, including, e.g., a size/shape of the housing 520, a profile (slope or non-sloped) of the window surface 530, whether and to what degree the window surface 530 includes a hydrophobic coating, a time of rotation, etc. For example, a rate of rotation for a regular operating mode of the sensor system 500 may be between about 0 rotations per minute and about 800-1000 rotations per minute, and a rate of rotation when the sensor system 500 is expelling fluid or other materials from the window surface 530 may be about 1500 rotations per minute. As would be recognized by a person of ordinary skill in the art, these rates are illustrative and should not be construed as being limiting in any way. For example, the rate of rotation during a regular operating mode may be below 800 rotations per minute or above 1000 rotations per minute, and the rate of rotation when the sensor system 500 is expelling fluid or other materials may be below 1500 rotations per minute or above 1500 rotations per minute in certain example embodiments.

As best shown in FIG. 6, the nozzle assembly 505 includes a generally dome-shaped housing 555 that defines a space 560 in which one or more nozzles 565 are disposed. For example, a plurality of nozzles 565 may be spaced generally along a perimeter of the housing 555. The housing 555 can be configured to generally protect the nozzles 565 from a surrounding environment. The housing 555 is coupled to or integrally formed with the housing 520. The housing 555 can be formed from any suitable material, such as (optical or non-optical grade) metal, plastic, polycarbonate, glass, etc.

The nozzles 565 are configured to store and/or selectively dispense fluid 575 to the sensor assembly 510. The fluid 575 can include, e.g., water, a cleaning agent, or another liquid. For example, the nozzles 565 can include or be coupled to one or more reservoirs (not shown) storing the fluid 575. The nozzles 565 can include one or more nozzles, pumps, valves, or other mechanisms for dispensing the fluid, e.g., by releasing and/or propelling the fluid 575.

In an example embodiment, the controller of the sensor system 500, e.g., controller 410 shown in FIG. 4, is configured to cause the nozzles 565 to provide the fluid 575 to the window surface 530 upon a determination by the controller that the window surface 530 is in need of cleaning. For example, the controller may determine that the window surface 530 is in need of cleaning if the sensors 540 indicate that dirt, dust, debris, or another material is obstructing a field of view of at least one of the sensors 540. The controller can be further configured to cause the actuating mechanism 545 to initiate a rotation of the housing 520 and/or the window surface 530, or to change (e.g., by increasing or decreasing) a speed of rotation thereof, once the fluid 575 is provided to the window surface 530. For example, the controller can cause the actuating mechanism 545 to initiate or increase a speed of rotation of the housing 520 and/or window surface 530 upon (or soon before or after) providing the fluid 575, or after first slowing or maintaining a speed of the rotation (or non-rotation) of the housing 520 and/or window surface 530 for a period of time to allow the fluid 575 to clean the window surface 530 before it is expelled from the window surface 530. For example, gravitational forces, centrifugal forces, and/or other forces may effectively push or otherwise force the fluid 575 (and, potentially, dirt, dust, debris, or other material coupled to the fluid 575 or otherwise disposed on the window surface 530) off of the window surface 530 when the housing 520 is rotated.

In an example embodiment, the controller 410 also can be configured to cause the actuating mechanism 545 to initiate rotation of the housing 520, or change (e.g., by increasing or decreasing) a speed of rotation of the housing 520, without the nozzles 565 providing fluid 575 to the window surface 530, e.g., in response to detecting a liquid, such as rain, water droplets, etc., on the window surface 530. For example, if rain, water, or another liquid is detected within a field of view of a sensor 540, the actuating mechanism 545 can initiate, or change (e.g., by increasing or decreasing) a speed of, rotation of the housing 520 to prevent the liquid from depositing on, and/or clinging to, the window surface 530. Thus, the window surface 530 can be cleared of the obstruction with or without provision of the fluid 575 by the nozzles 565.

In an example embodiment, a bottom of the housing 555 includes at least one opening 580 defining a channel through which the fluid 575 can be provided to the window surface

530. Similarly, the housing 520, e.g., within the window surface 530 and/or any bottom surface 527, can include at least one opening 585 defining a channel through which at least a portion of the fluid 575 can be expelled from the window surface 530. For example, gravitational forces may effectively push or otherwise force at least a portion of the fluid 575 through the opening 580 onto the window surface 530 and then through the opening 585.

It should be appreciated that the configuration of the sensor system 500 and each of the components thereof are illustrative and not limiting in any way. In alternative example embodiments, certain components may be added, removed, rearranged, or otherwise changed without departing from the spirit or scope of the disclosure.

Figure 10:
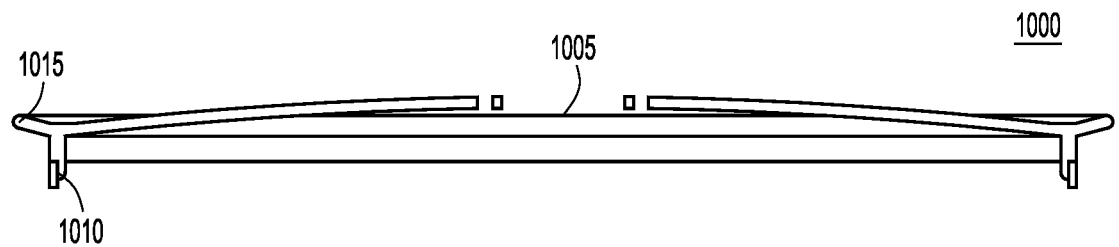
FIG. 10 is a cross-sectional side view of a top surface of a rotatable camera housing, according to an example embodiment.

For example, FIG. 10 illustrates a top surface 1000, which may be included in a rotatable camera housing in an alternative example embodiment. The top surface 1000 has a profile that is substantially sloped downward from a center 1005 of the top surface 1000, towards a top of a window surface 1010 of the rotatable camera housing. The top surface 1000 includes a protrusion 1015 that extends past the window surface 1010, substantially away from the center 1005 and at least one sensor (not shown) disposed within the rotatable camera housing. The protrusion 1015 has a profile with a slope that extends substantially upward relative to the window surface 1010.

The protrusion 1015 and/or the profile of the top surface 1000 may facilitate removal of fluid from the top surface 1000. For example, the slope of the top surface 1000 and/or the slope of the protrusion 1015 may promote removal of the fluid by centrifugal and/or gravitational forces when the rotatable camera housing is rotated. The fluid can include fluid provided by sources external to a sensor system that includes the rotatable camera housing, such as rain, mud, or other items from an environment surrounding the sensor system, and/or fluid provided by a nozzle assembly associated with the rotatable camera housing.

Figure 11:
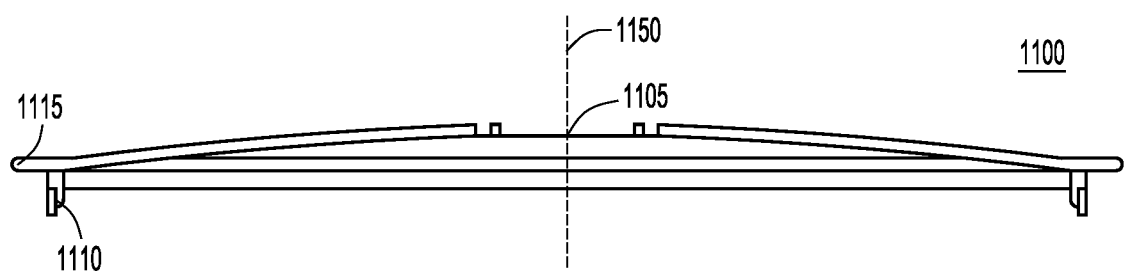
FIG. 11 is a cross-sectional side view of a top surface of a rotatable camera housing, according to another example embodiment.

FIG. 11 illustrates a top surface 1100 of a rotatable camera housing, according to another example embodiment. The top surface 1100 has a profile that is substantially sloped downward from a center 1105 of the top surface 1100, towards a top of a window surface 1110 of the rotatable camera housing. The top surface 1100 includes a protrusion 1115 that extends past the window surface 1110, substantially away from the center 1105 and at least one sensor (not shown) disposed within the rotatable camera housing. The protrusion 1115 has a profile with a slope that extends with a substantially flat slope, substantially perpendicular to an axis of rotation 1150 of the rotatable camera housing.

Similar to the protrusion 1015 and top surface 1000 described above, the protrusion 1115 and/or the profile of the top surface 1100 may facilitate removal of fluid from the top surface 1100. For example, the slope of the top surface 1100 and/or the slope of the protrusion 1115 may promote removal of the fluid by centrifugal and/or gravitational forces when the rotatable camera housing is rotated.

Figure 12:
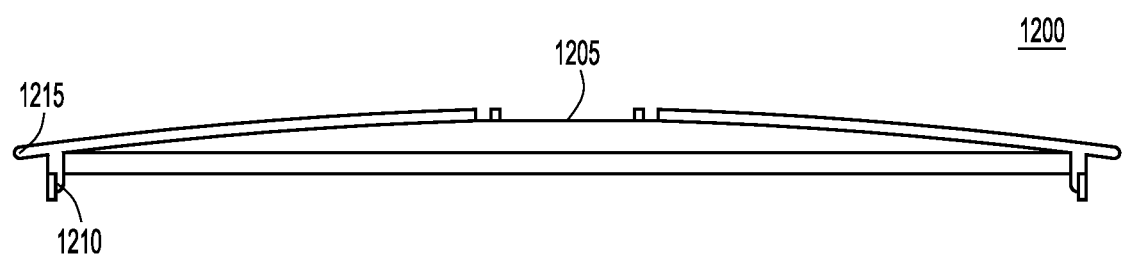
FIG. 12 is a cross-sectional side view of a top surface of a rotatable camera housing, according to yet another example embodiment.

FIG. 12 is a cross-sectional side view of a top surface 1200 of a rotatable camera housing, according to yet another example embodiment. The top surface 1200 has a profile that is substantially sloped downward from a center 1205 of the top surface 1200, towards a top of a window surface 1210 of the rotatable camera housing. The top surface 1200 includes a protrusion 1215 that extends past the window surface 1110, substantially away from the center 1205 and at least one sensor (not shown) disposed within the rotatable camera housing. The protrusion 1215 has a profile with a slope that is substantially similar to the slope of the top surface 1200. That is, the top surface 1200 has a slope that generally continues through the protrusion 1215.

Similar the protrusions 1015 and 1115 and top surfaces 1000 and 1100 described above, the protrusion 1215 and/or the profile of the top surface 1200 may facilitate removal of fluid from the top surface 1200. For example, the slope of the top surface 1200 and/or the slope of the protrusion 1215 may promote removal of the fluid by centrifugal and/or gravitational forces when the rotatable camera housing is rotated.

Figure 13:
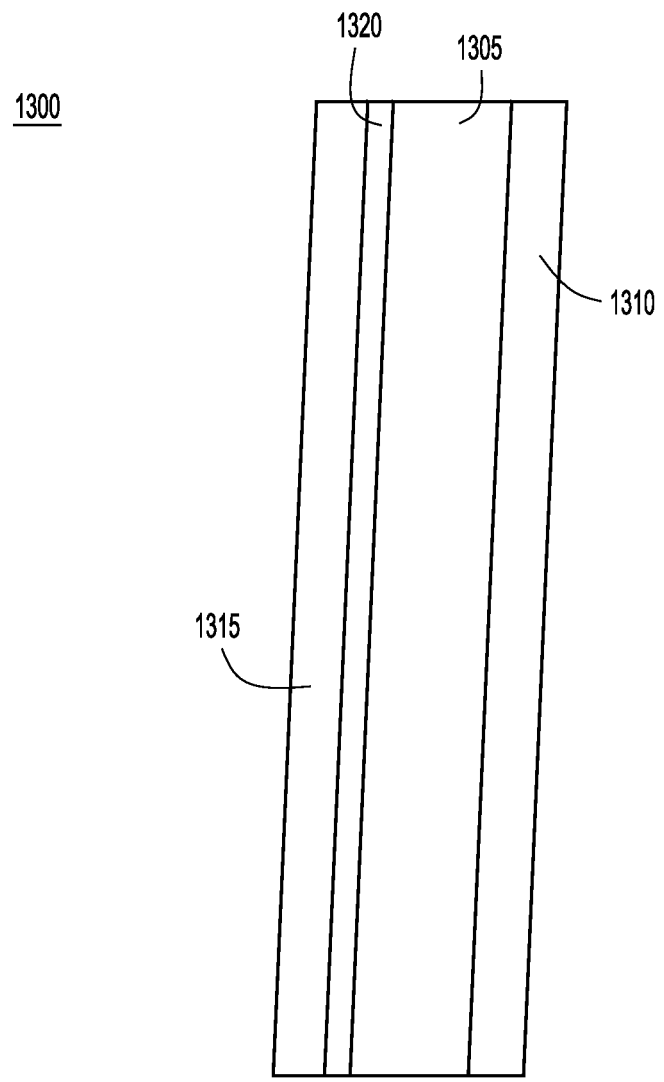
FIG. 13 is a cross-sectional cutaway view of a window surface of a rotatable camera housing, according to an example embodiment.

FIG. 13 is a cross-sectional cutaway view of a window surface 1300 of a rotatable camera housing, according to an example embodiment. The window surface 1300 includes a substantially transparent window material 1305, which can be formed from any suitable material, such as (optical or non-optical grade) metal, plastic, polycarbonate, glass, etc. For example, the window material 1305 can have hardness properties to protect the window surface 1300 and provide impact resistance to components housed by the window surface 1300 (e.g., sensors). An exterior of the window surface 1300, which is exposed to an environment surrounding the rotatable camera housing, includes a hydrophobic material 1310, such as a coating or film. For example, the hydrophobic material 1310 can be configured to repel rain and/or other liquids from the exterior of the window surface 1300. The hydrophobic material 1310 also may have anti-reflective properties.

An interior of the window surface 1300, which is generally not exposed to the surrounding environment of the rotatable camera housing, can include an anti-fog material 1315 and an anti-reflective material 1320. For example, the hydrophobic material 1310, anti-fog material 1315, and anti-reflective material 1320 can improve a performance quality of sensors within the rotatable camera housing, e.g., by preventing liquid, reflections, fog, etc. from impacting images captured by the sensors. As would be recognized by a person of ordinary skill in the art, the size, shape, and configuration of the window surface 1300 presented herein are illustrative and should not be construed as being limiting in any way. For example, in an alternative example embodiment, the window surface 1300 may include additional, less, or different materials than the materials described herein, and/or positions of the materials may be different. For example, in an alternative example embodiment, the anti-fog material 1315 may be disposed between the anti-reflective material 1320 and the window material 1305. Alternatively, an anti-fog material 1315 may not be provided or may be substituted by alternative mechanisms for preventing fog like directing or redirecting heat from one or more heat pipes, fans, motors, sensors, or other components inside the rotatable camera housing.

Figure 14:
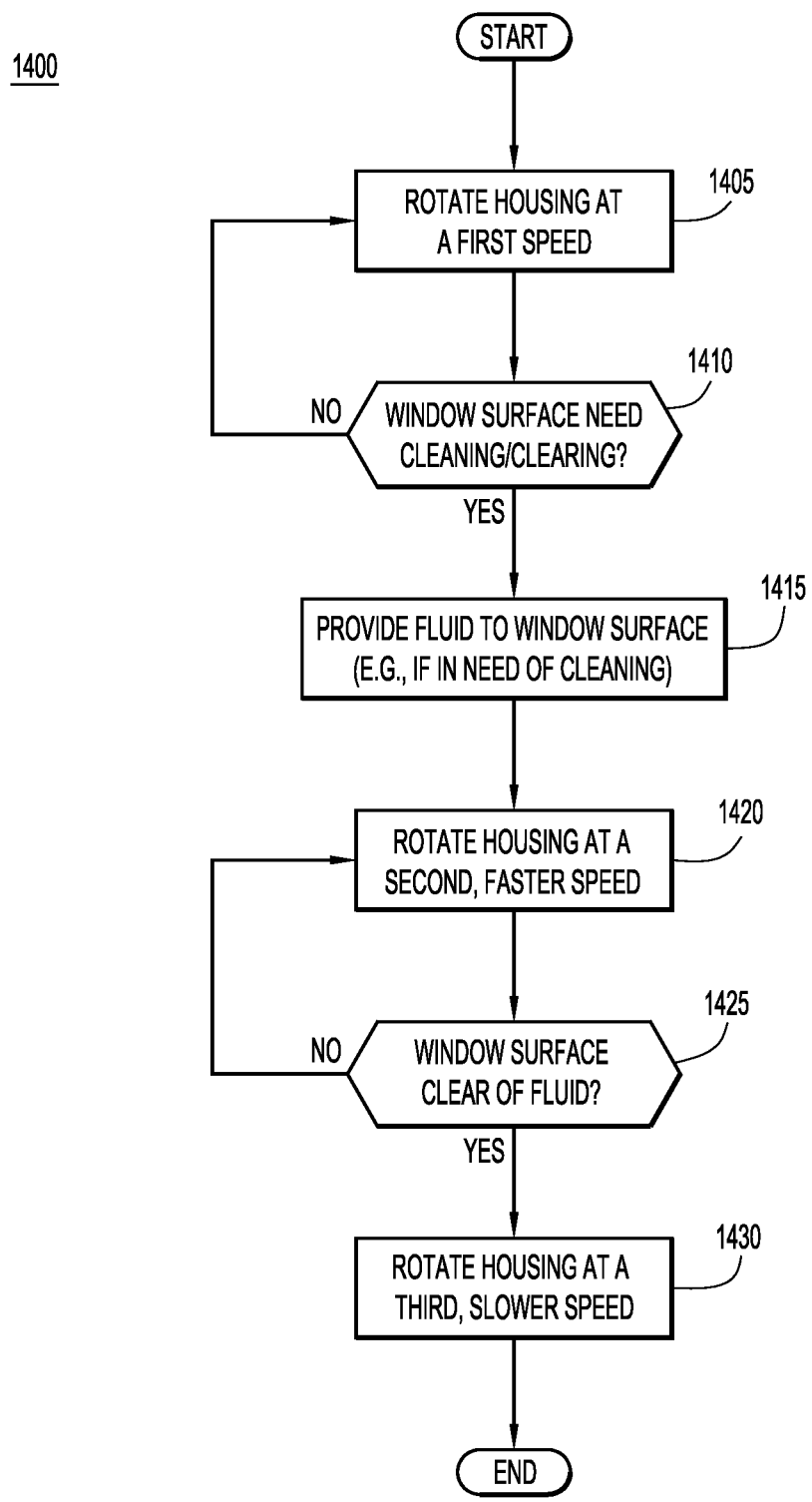
FIG. 14 is a process flow diagram illustrating a method of cleaning and/or clearing a sensor, according to an example embodiment.

FIG. 14 is a process flow diagram illustrating a method 1400 of cleaning a sensor, according to an example embodiment. In step 1405, an actuating mechanism of a sensor cleaning mechanism rotates a housing at a first speed. The housing includes a window surface disposed substantially within a field of view of at least one sensor. For example, the sensor(s) can be configured to capture images, sound, and/or other signals or information from an environment associated with the housing.

In step 1410, a controller of the sensor cleaning mechanism determines whether the window surface is in need of cleaning and/or clearing. For example, the controller can determine that the window surface is in need of cleaning if dirt, dust, debris, and/or another material is disposed on the window surface. The controller also can determine that the window surface is in need of clearing (with or without also being in need of cleaning) if rain, water, or another liquid is disposed on the window surface. The controller can make the determination in step 1410, e.g., using one or more measurements (e.g., images) captured by the sensor(s). If the controller determines in step 1410 that the window surface is not in need of cleaning or clearing, then the method 1400 continues to step 1405 in which the actuating mechanism continues to rotate the housing at the first speed.

If the controller determines in step 1410 that the window surface is in need of cleaning or clearing, then the method 1400 continues to step 1415. In step 1415, a fluid providing mechanism of the sensor cleaning mechanism provides a fluid, such as water, a cleaning agent, or another liquid, to the window surface. For example, the fluid providing mechanism can provide the fluid via one or more nozzles, pumps, valves, reservoirs, and/or other mechanisms for storing and selectively dispensing fluid. In an example embodiment, the fluid providing mechanism provides the fluid to the window surface in step 1415 only if the window surface is need of cleaning. For example, the fluid providing mechanism may provide the fluid or forego providing the fluid if the window surface is in need of clearing but not in need of cleaning.

In step 1420, an actuating mechanism of the sensor cleaning mechanism rotates the housing at a second speed, which may be faster or slower than the first speed, thereby causing at least a portion of the fluid (i.e., any provided fluid and/or any detected rain, water, or other liquid) to be expelled from the window surface. For example, the actuating mechanism may increase a speed of rotation of the housing upon (or soon before or after) providing the fluid in step 1415, or after first slowing or maintaining the speed of the rotation of the housing for a period of time to allow the fluid to clean the window surface before it is expelled from the window surface through the rotation in step 1420. For example, centrifugal forces and/or gravitational forces may push or otherwise force the fluid from the window surface when the actuating mechanism rotates the housing.

In step 1425, the controller determines whether the window surface is clear of the (provided or detected) fluid. For example, the controller can make this determination using one or more images captured by the sensor(s). If the controller determines in step 1425 that the window surface is not clear of the fluid, then the method 1400 continues to step 1420 in which the controller causes the actuating mechanism to continue to rotate the housing at the second speed, to continue expelling the fluid from the window surface.

If the controller determines in step 1425 that the window surface is clear of the fluid, then the method 1400 continues to step 1430. In step 1430, the controller causes the actuating mechanism to change a speed of rotation of the housing to a third speed, which may be slower or faster than the second speed. For example, the third speed may be zero (i.e., the actuating mechanism may stop rotating the housing), it may be the same as the first speed, it may be another speed between zero and the second speed, or it may be another speed.

As would be recognized by a person of skill in the art, the steps associated with the methods of the present disclosure, including the method 1400 presented in FIG. 14, may vary widely. Steps may be added, removed, altered, combined, and reordered without departing from the spirit or the scope of the present disclosure. Therefore, the example methods are to be considered illustrative and not restrictive, and the examples are not to be limited to the details given herein but may be modified within the scope of the appended claims.

Figure 15:
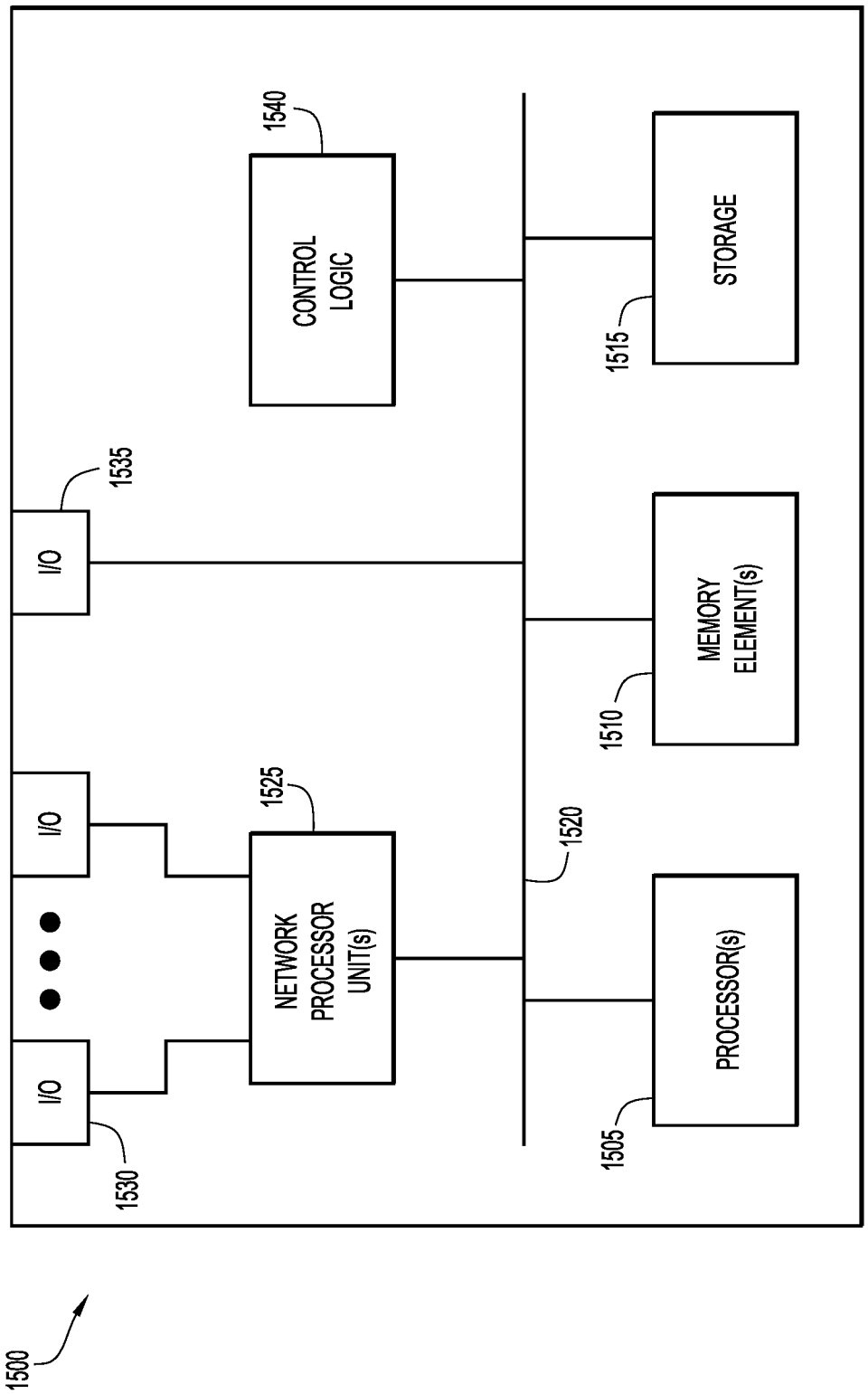
FIG. 15 is a block diagram of a computing device configured to perform operations in connection with cleaning a sensor, according to an example embodiment.

Referring now to FIG. 15, FIG. 15 illustrates a hardware block diagram of a computing device 1500 that may perform functions associated with operations discussed herein in connection with the techniques depicted in FIGS. 1-14. In various example embodiments, a computing device, such as computing device 1500 or any combination of computing devices 1500, may be configured as any entity/entities as discussed for the techniques depicted in connection with FIGS. 1-14, such as processor 305 shown in FIG. 3 or controller 410 of the sensor system 320 shown in FIG. 4, in order to perform operations of the various techniques discussed herein.

In at least one embodiment, computing device 1500 may include one or more processor(s) 1505, one or more memory element(s) 1510, storage 1515, a bus 1520, one or more network processor unit(s) 1525 interconnected with one or more network input/output (I/O) interface(s) 1530, one or more I/O interface(s) 1535, and control logic 1540. In various embodiments, instructions associated with logic for computing device 1500 can overlap in any manner and are not limited to the specific allocation of instructions and/or operations described herein.

In at least one embodiment, processor(s) 1505 is/are at least one hardware processor configured to execute various tasks, operations and/or functions for computing device 1500 as described herein according to software and/or instructions configured for computing device. Processor(s) 1505 (e.g., a hardware processor) can execute any type of instructions associated with data to achieve the operations detailed herein. In one example, processor(s) 1505 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 1510 and/or storage 1515 is/are configured to store data, information, software, and/or instructions associated with computing device 1500, and/or logic configured for memory element(s) 1510 and/or storage 1515. For example, any logic described herein (e.g., control logic 1540) can, in various embodiments, be stored for computing device 1500 using any combination of memory element(s) 1510 and/or storage 1515. Note that in some embodiments, storage 1515 can be consolidated with memory element(s) 1510 (or vice versa), or can overlap/exist in any other suitable manner.

In at least one embodiment, bus 1520 can be configured as an interface that enables one or more elements of computing device 1500 to communicate in order to exchange information and/or data. Bus 1520 can be implemented with any architecture designed for passing control, data and/or information between processors, memory elements/storage, peripheral devices, and/or any other hardware and/or software components that may be configured for computing device 1500. In at least one embodiment, bus 1520 may be implemented as a fast kernel-hosted interconnect, potentially using shared memory between processes (e.g., logic), which can enable efficient communication paths between the processes.

In various embodiments, network processor unit(s) 1525 may enable communication between computing device 1500 and other systems, entities, etc., via network I/O interface(s) 1530 to facilitate operations discussed for various embodiments described herein. In various embodiments, network processor unit(s) 1525 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1500 and other systems, entities, etc. to facilitate operations for various embodiments described herein. In various embodiments, network I/O interface(s) 1530 can be configured as one or more Ethernet port(s), Fibre Channel ports, and/or any other I/O port(s) now known or hereafter developed. Thus, the network processor unit(s) 1525 and/or network I/O interfaces 1530 may include suitable interfaces for receiving, transmitting, and/or otherwise communicating data and/or information in a network environment.

I/O interface(s) 1535 allow for input and output of data and/or information with other entities that may be connected to computer device 1500. For example, I/O interface(s) 1535 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1540 can include instructions that, when executed, cause processor(s) 1505 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1540) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1510 and/or storage 1515 can store data, software, code, instructions (e.g., processor instructions), logic, parameters, combinations thereof, and/or the like used for operations described herein. This includes memory element(s) 1510 and/or storage 1515 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, in one form, a method can include providing fluid to a window surface of a housing, the window surface being disposed substantially within a field of view of a sensor. The housing can be rotated about the sensor at a first speed, thereby causing at least a portion of the fluid to be expelled from the window surface. A speed of rotation of the housing can be changed from the first speed to a second speed, which is greater than zero, in response to determining that the window surface is substantially clear of the fluid. For example, changing the speed of rotation can include slowing rotation of the housing to the second speed, the second speed being slower than the first speed.

For example, providing the fluid to the window surface can be responsive to determining, via the sensor, that the window surface is in need of cleaning, e.g., by analyzing one or more images captured by the sensor using a computer vision software model. Rotating can include, for example, changing a speed of rotation of the housing from a third speed to the first speed. For example, the third speed can be substantially equal to the second speed. Rotating can include, for example, increasing the speed of rotation of the housing to the first speed after a predetermined period of time passes after providing the fluid to the window surface of the housing. In an example embodiment, the method can further include continuing to rotate the housing at the first speed in response to determining that the window surface is not substantially clear of the fluid.

In another form, an apparatus can include at least one sensor configured to observe a condition associated with a vehicle, and a housing configured to be mounted on the vehicle, the housing comprising a window surface configured to be disposed substantially within a field of view of the sensor. A fluid providing mechanism can be configured to provide fluid to the window surface. An actuating mechanism can be configured to rotate the housing about the at least one sensor at a first speed, thereby causing at least a portion of the fluid to be expelled from the window surface, and change a speed of rotation of the housing to a second speed, which is greater than zero, in response to a determination that the window surface is substantially clear of the fluid.

In another form, a system can include a plurality of sensors configured to observe a condition associated with a vehicle. A housing can be configured to be mounted on the vehicle, the housing comprising a top surface and a window surface extending from the top surface, the top surface and the window surface defining a space within which the plurality of sensors are substantially disposed, a body of the window surface extending across fields of view of the plurality of sensors. A fluid providing mechanism can be configured to provide fluid to the window surface. An actuating mechanism configured to rotate the housing about the plurality of sensors at a first speed, thereby causing at least a portion of the fluid to be expelled from the window surface. A controller can be configured to determine, by analyzing one or more images captured by the plurality of sensors using a computer vision software model, whether the window surface is substantially clear of the fluid. For example, the actuating mechanism can be configured to change a speed of rotation of the housing to a second speed, which is greater than zero, in response to a determination by the controller that the window surface is substantially clear of the fluid.

In another form, a method can include detecting a fluid on a window surface of a housing, the window surface being disposed substantially within a field of view of a sensor. The housing can be rotated about the sensor at a first speed, thereby causing at least a portion of the fluid to be expelled from the window surface. Rotation of the housing can be slowed to a second speed, which is slower than the first speed but greater than zero, in response to determining that the window surface is substantially clear of the fluid. For example, the sensor can detect the fluid. The detecting can include, e.g., analyzing one or more images captured by the sensor using a computer vision software model. Rotating can include, e.g., increasing a speed of rotation of the housing from a third speed to the first speed. For example, the third speed can be substantially equal to the second speed. In an example embodiment, the rotation can continue at the first speed in response to determining that the window surface is not substantially clear of the fluid.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. An apparatus comprising:
 a plurality of sensors having fields of view extending outward from a central axis and configured to observe a condition associated with a vehicle;
 a housing configured to be mounted on the vehicle, the housing comprising:
  a window surface configured to be disposed within a field of view of at least one sensor of the plurality of sensors,
  at least one first opening that defines a first channel for providing fluid to the window surface and positioned above the at least one sensor,
  at least one second opening that defines a second channel for expelling the fluid from the window surface and is positioned below the at least one sensor;
  a top baffle and a bottom baffle, each having a plurality of openings for the plurality of sensors, wherein the plurality of sensors are positioned between the top baffle and the bottom baffle, and
  a shaft that is coaxial with the central axis and between the top baffle and the bottom baffle, wherein the plurality of sensors are positioned around the shaft;
 a fluid providing mechanism configured to provide the fluid to the window surface and is positioned above the at least one first opening; and
 an actuating mechanism configured to:
  rotate the housing about the at least one sensor at a first speed, which is greater than zero, thereby causing at least a portion of the fluid to be expelled from the window surface, and
  change a speed of rotation of the housing to a second speed, which is greater than zero and different from the first speed, in response to a determination that the window surface is clear of the fluid.

2. The apparatus of claim 1, wherein the fluid providing mechanism is configured to provide the fluid to the window surface in response to a first determination made using the at least one sensor, that the window surface is in need of cleaning based on a presence of a substance on the window surface and the fluid providing mechanism is configured to forego providing the fluid based on a second determination made using the at least one sensor, that a liquid is present on the window surface that is to be cleared.

3. The apparatus of claim 2, further comprising:
 a controller configured to make the first determination and the second determination, by analyzing one or more images captured by the at least one sensor using a computer vision software model.

4. The apparatus of claim 1, wherein the actuating mechanism is configured to rotate the housing by increasing the speed of rotation of the housing from a third speed to the first speed, the third speed being slower than the first speed but greater than zero.

5. The apparatus of claim 4, wherein the third speed is equal to the second speed.

6. The apparatus of claim 4, wherein the actuating mechanism is configured to increase the speed of rotation of the housing from the third speed to the first speed after a predetermined period of time passes after the fluid providing mechanism provides the fluid to the window surface.

7. The apparatus of claim 1, wherein the actuating mechanism is further configured to continue to rotate the housing at the first speed in response to determining that the window surface is not clear of the fluid.

8. The apparatus of claim 1, wherein the actuating mechanism is configured to rotate the housing about the plurality of sensors.

9. The apparatus of claim 1, wherein the housing comprises a top surface, the window surface extending from the top surface, the top surface and the window surface defining a space within which the at least one sensor is disposed.

10. The apparatus of claim 9, wherein the top surface has a profile that is sloped downward from a center of the top surface towards the window surface.

11. The apparatus of claim 10, wherein the top surface comprises a protrusion that extends past the window surface, away from the at least one sensor, the protrusion having a protrusion profile with a protrusion slope that is similar to a slope of the top surface.

12. The apparatus of claim 9, wherein the top surface comprises a protrusion that extends past the window surface, away from the at least one sensor, the protrusion extending upward relative to the window surface.

13. The apparatus of claim 9, wherein the top surface comprises a protrusion that extends past the window surface, away from the at least one sensor and perpendicular to an axis of rotation of the housing.

14. The apparatus of claim 1, wherein the actuating mechanism is configured to change the speed of rotation of the housing by slowing rotation of the housing to the second speed, the second speed being slower than the first speed.

15. A system comprising:
 a plurality of sensors configured to observe a condition associated with a vehicle and have fields of view extending outward from a central axis;
 a housing configured to be mounted on the vehicle, the housing comprising:
  a top surface,
  a window surface extending from the top surface, the top surface and the window surface defining a space within which the plurality of sensors are disposed, a body of the window surface extending across the fields of view of the plurality of sensors, at least one first opening that defines a first channel for providing fluid to the window surface and positioned above the plurality of sensors, at least one second opening that defines a second channel for expelling the fluid from the window surface and is positioned below the plurality of sensors, a top baffle and a bottom baffle, each having a plurality of openings for the plurality of sensors, wherein the plurality of sensors are positioned between the top baffle and the bottom baffle, and a shaft that is coaxial with the central axis and between the top baffle and the bottom baffle, wherein the plurality of sensors are positioned around the shaft;

a fluid providing mechanism configured to provide the fluid to the window surface and is positioned above the at least one first opening;

an actuating mechanism configured to rotate the housing about the plurality of sensors at a first speed greater than zero, thereby causing at least a portion of the fluid to be expelled from the window surface; and a controller configured to:
determine whether the window surface is to be cleaned or cleared, and
determine, by analyzing one or more images captured by the plurality of sensors using a computer vision software model, whether the window surface is clear of the fluid, wherein the actuating mechanism is further configured to change a speed of rotation of the housing to a second speed, which is greater than zero and different from the first speed, in response to a determination by the controller that the window surface is clear of the fluid.

16. The system of claim 15, wherein the controller is further configured to determine whether the window surface is in need of cleaning by analyzing one or more other images captured by the plurality of sensors, and the fluid providing mechanism is configured to provide the fluid to the window surface based on that determination.

17. The system of claim 15, wherein the actuating mechanism is configured to rotate the housing by increasing the speed of rotation of the housing from a third speed to the first speed, the third speed being slower than the first speed but greater than zero.

18. The system of claim 17, wherein the third speed is equal to the second speed.

19. The system of claim 17, wherein the actuating mechanism is configured to increase the speed of rotation of the housing from the third speed to the first speed after a predetermined period of time passes after the fluid providing mechanism provides the fluid to the window surface.

20. The system of claim 15, wherein the actuating mechanism is further configured to continue to rotate the housing at the first speed in response to determining by the controller that the window surface is not clear of the fluid.

21. The system of claim 15, wherein the top surface has a profile that is sloped downward from a center of the top surface towards the window surface.

22. The system of claim 21, wherein the top surface comprises a protrusion that extends past the window surface, away from the plurality of sensors, the protrusion having a protrusion profile with a protrusion slope that is similar to a slope of the top surface.

23. The system of claim 15, wherein the top surface comprises a protrusion that extends past the window surface, away from the plurality of sensors, the protrusion extending upward relative to the window surface.

24. The system of claim 15, wherein the top surface comprises a protrusion that extends past the window surface, away from the plurality of sensors and perpendicular to an axis of rotation of the housing.

25. The system of claim 15, wherein the controller is further configured to cause the actuating mechanism to rotate the housing about the plurality of sensors at a third speed without the fluid providing mechanism providing the fluid to the window surface in response to detecting a liquid in a field of view of at least one of the plurality of sensors, the third speed being faster than the second speed.

26. The system of claim 15, wherein the fluid providing mechanism comprises a plurality of nozzles configured to provide the fluid to the window surface.

27. The system of claim 15, further comprising:
a fluid providing mechanism housing that is dome-shaped and defines a space for one or more nozzles, wherein the fluid providing mechanism housing is coupled to the housing and includes the at least one first opening below the one or more nozzles.

28. The system of claim 27, wherein the fluid providing mechanism housing includes a protruding portion that protrudes outward from the central axis and extends outside of the window surface and wherein the at least one first opening is at the protruding portion.

29. An autonomous vehicle comprising:
a propulsion system configured to drive the autonomous vehicle;
a sensor system including:
a housing mounted on the autonomous vehicle and configured to hold a plurality of sensors therein that have fields of view extending outward from a central axis and that are is configured to observe one or more conditions associated with the autonomous vehicle, the housing including:
at least one first opening that defines a first channel for providing fluid to a window surface that extends across the fields of view of the plurality of sensors,
at least one second opening that defines a second channel for expelling the fluid from the window surface and is positioned below the plurality of sensors,
a top baffle and a bottom baffle, each having a plurality of openings for the plurality of sensors, wherein the plurality of sensors are positioned between the top baffle and the bottom baffle, and
a shaft that is coaxial with the central axis and between the top baffle and the bottom baffle, wherein the plurality of sensors are positioned around the shaft; and
a sensor cleaning mechanism positioned above the plurality of sensors and configured to:
provide the fluid to the window surface that is disposed within the fields of view of the plurality of sensors,
rotate the housing about at least one sensor of the plurality of sensors at a first speed that is greater than zero, thereby causing at least a portion of the fluid to be expelled from the window surface, and
change a speed of rotation of the housing to a second speed, which is greater than zero and different from the first speed, in response to determining that the window surface is clear of the fluid; and
a control system configured to control operations of the propulsion system and the sensor system.

30. The autonomous vehicle of claim 29, wherein the housing includes a top surface and the window surface extending from the top surface, the top surface and the window surface defining a space within which the at least one sensor is disposed, a body of the window surface extending across fields of view of the at least one sensor.

31. The autonomous vehicle of claim 29, wherein the sensor cleaning mechanism includes:
- a fluid providing mechanism configured to provide fluid to the window surface; and
- an actuating mechanism configured to rotate the housing about the at least one sensor at the first speed.

32. The autonomous vehicle of claim 31, wherein the control system is further configured to determine whether the window surface is to be cleaned by analyzing one or more images captured by the at least one sensor, and the fluid providing mechanism is configured to provide the fluid to the window surface based on that determination.

33. The autonomous vehicle of claim 29, wherein the control system is further configured to determine, by analyzing one or more images captured by the at least one sensor using a computer vision software model, whether the window surface is clear of the fluid.

34. The autonomous vehicle of claim 29, wherein the sensor cleaning mechanism is further configured to continue to rotate the housing at the first speed in response to a determination by the control system that the window surface is not clear of the fluid.

* * * * *

UNITED STATES PATENT AND TRADEMARK OFFICE
CERTIFICATE OF CORRECTION

PATENT NO. : 12,269,437 B2
APPLICATION NO. : 17/096152
DATED : April 8, 2025
INVENTOR(S) : Yuzhou Lucy Zhuang et al.

It is certified that error appears in the above-identified patent and that said Letters Patent is hereby corrected as shown below:

In the Claims

Claim 29, Column 24, Line 34, please replace "axis and that are is configured to observe" with --axis and that are configured to observe--

Signed and Sealed this
Twenty-ninth Day of July, 2025

Coke Morgan Stewart
*Acting Director of the United States Patent and Trademark Office*